United States Patent
Miller et al.

(10) Patent No.: US 7,759,854 B2
(45) Date of Patent: Jul. 20, 2010

(54) LAMP WITH ADJUSTABLE COLOR

(75) Inventors: Michael E. Miller, Honeoye Falls, NY (US); Thomas E. Madden, Fairport, NY (US); Ronald S. Cok, Rochester, NY (US); Paul J. Kane, Rochester, NY (US)

(73) Assignee: Global OLED Technology LLC, Wilmington, DE (US)

( * ) Notice: Subject to any disclaimer, the term of this patent is extended or adjusted under 35 U.S.C. 154(b) by 450 days.

(21) Appl. No.: 11/755,028

(22) Filed: May 30, 2007

(65) Prior Publication Data

US 2008/0297027 A1 Dec. 4, 2008

(51) Int. Cl.
*H05B 33/04* (2006.01)
*H05B 33/10* (2006.01)

(52) U.S. Cl. ............................. 313/498; 315/160

(58) Field of Classification Search .......... 313/498–512
See application file for complete search history.

(56) References Cited

U.S. PATENT DOCUMENTS

| | | | |
|---|---|---|---|
| 5,294,869 A | 3/1994 | Tang et al. | |
| 5,703,436 A | 12/1997 | Forrest et al. | |
| 6,132,072 A | 10/2000 | Turnbull et al. | |
| 6,841,949 B2 | 1/2005 | Duggal | |
| 7,014,336 B1 * | 3/2006 | Ducharme et al. | 362/231 |
| 7,122,842 B2 | 10/2006 | Hill | |
| 2003/0170491 A1 * | 9/2003 | Liao et al. | 428/690 |
| 2004/0113875 A1 | 6/2004 | Miller et al. | |
| 2004/0264193 A1 | 12/2004 | Okumura | |
| 2005/0127381 A1 * | 6/2005 | Vitta et al. | 257/88 |
| 2005/0194608 A1 | 9/2005 | Chen | |
| 2006/0043361 A1 | 3/2006 | Lee et al. | |
| 2006/0098077 A1 | 5/2006 | Dowling | |

FOREIGN PATENT DOCUMENTS

| | | |
|---|---|---|
| EP | 1 078 556 | 9/2001 |
| EP | 1610593 | 12/2005 |

OTHER PUBLICATIONS

"Method of Measuring and Specifiying Color-Rendering of Light Sources," pp. 9-13, CIE, Pub. 13.2, Vienna, Austria, 1995.
"From visible to white light emission by GaN quantum dots on Si(111) substrate", by Damilano et al., Applied Physics Letters, vol. 75, No. 7, Aug. 16, 1999.

(Continued)

*Primary Examiner*—Nimeshkumar D. Patel
*Assistant Examiner*—Peter R Haderlein
(74) *Attorney, Agent, or Firm*—McKenna Long & Alrdridge LLP

(57) ABSTRACT

A white-light electro-luminescent lamp having an adjustable spectral power distribution, including a first light-emitting element which emits light within each of three wavelength bands, 1) between 440 and 520 nm, 2) between 520 and 600 nm, and 3) between 600 and 680 nm. A second light-emitting element emits light within each of three wavelength bands, 1) between 440 and 520 nm, 2) between 520 and 600 nm, and 3) between 600 and 680 nm. A controller modulates the integrated spectral power of the light produced by the first and the second light-emitting elements such that the spectral power distribution of the light formed by combining the light produced by the modulated first and second light-emitting elements is substantially equal to a CIE standard daylight spectral power distribution for correlated color temperatures between 4000K-9500K.

20 Claims, 15 Drawing Sheets

OTHER PUBLICATIONS

"Colorimetry (Official Recommendations of the International Commission on Illumination)", CIE pub. 15, Vienna, Austria, 2004 (see Appendix E—Information on the Use of Planck's Equation for Standard Air).

* cited by examiner

LAMP WITH ADJUSTABLE COLOR

FIELD OF THE INVENTION

The present invention relates to the structure and manufacture of a lamp and, more particularly, to a lamp capable of producing a multiplicity of colors and spectral power distributions of white light which approximate blackbody or daylight lighting sources with two, independently addressable, light-emitting elements.

BACKGROUND OF THE INVENTION

Lamps capable of producing multiple colors of light are known to satisfy many applications; including lamps for general purpose lighting that allow "white" light to be generated in such a way to allow the user to adjust the correlated color temperature of the light. Lights with adjustable color temperature are further known for use in specialized lighting applications, such as camera strobes and motion picture lighting systems. Within this application space, it is most desirable to create lamps that provide outputs having both colorimetric coordinates and spectral power distributions that match those of typical blackbody radiators, typical daylight lighting, or standard daylight sources. The colorimetric coordinates of natural light that exists during the day typically fall near a curve, referred to as the Planckian Locus or black body curve, within CIE chromaticity space. Methods for calculating daylight spectra for color temperatures between 4000K and 25000K have been specified within the art (Commission Internationale de l'Eclairage publication No. 15, *Colorimetry (Official Recommendations of the International Commission on Illumination)*, Vienna, Austria, 2004.). Standardized lighting conditions that are desirable to attain and fall near this curve; include those designated D50, D65, and D93, which correspond to daylight color temperatures of 5000K, 6500K, and 9300K, as well as so-called warmer lights, having lower correlated color temperatures, which are more similar in appearance to the light produced by tungsten lamps. In addition to having a lamp that is able to create light having the same colorimetric coordinates as these standardized lighting conditions, it is desirable to have a lamp that produced light having a spectral power distribution that matches the standardized spectral power distributions of these standardized light sources. One metric of the degree of match between the spectral power distribution of the light produced by a lamp and the spectral power distribution of these standard lighting conditions is a metric referred to as the CIE color rendering index or CRI (Commission Internationale de l'Eclairage publication No. 13.3, *Method of Measuring and Specifying Color-Rendering of Light Sources*, Vienna, Austria, 1995.).

CRI provides a standard method of specifying the degree to which the color appearance of a set of standard reflective objects illuminated by a given lamp matches the appearance of those same objects illuminated by light having the spectral power distribution to a specified standard source. Generally, lamps having a CRI of 80 or better provide a good match to the target spectral power distribution and are deemed to be of high quality.

Lamps known in the prior art that are capable of color control are constructed from at least three different, independently controlled light sources. Noh, in EP Patent 1 078 556, discuss a lamp created using three different fluorescent tubes, a rectifier, three ballasts and a controller for controlling the ballasts. Within this system, the illumination level of the three lamps is controlled to affect a change in the color temperature of the general purpose lighting device. However, this embodiment requires three different light sources that must all perform to a specified level and generate a specified spectral power distribution and be controlled independently. This control mechanism can be complex and is prone to error as each of the lamps age.

This disclosure also discusses the fact that the controller should be configured such that it has two perpendicular axes of control such that one axis ideally represents the luminance level of the lamp and the second axis represents the color temperature of the lamp. However, the authors fail to address the issue that by having three independent light sources, the chromaticity coordinates of the light that will be generated is likely to fall within a two-dimensional triangle in CIE chromaticity space with each corner of the triangle being represented by the chromaticity coordinate of each of the light sources. As such, the system will produce light with chromaticity coordinates which fall on the Planckian Locus only when the CIE chromaticity coordinates of the three light sources is positioned to span the Planckian Locus and the relative luminance produced by each of the three light sources is such that the mixture results in a light with chromaticity coordinates that fall on the Planckian Locus. For this reason, if any one of these lamps ages at a different rate than another (i.e., its spectral power distribution changes, or its luminance output decreases at a different rate than the others), the light output of the lamp is not only unlikely to have a desired color temperature but the chromaticity coordinate of the light output is unlikely to fall near the Planckian Locus and therefore the luminance and the position of the chromaticity coordinate of the lamp's output is unlikely to fall upon the Planckian Locus. Further, to control the illumination from the three sources to create light with chromaticity coordinates that fall near the Planckian Locus as the two controls are manipulated it is necessary to employ a microprocessor or similar device capable of determining the correct mixture of the three sources to create the correct color of light output. The need for a microprocessor can add significant cost and complexity to the overall system design.

Lamps having color temperature regulation have also been discussed by Okumura in US Publication 2004/0264193, entitled "Color Temperature-Regulable LED Light". Within this disclosure, at least two different embodiments of different, independently-addressable, LEDs are employed. In a first embodiment, a white LED, which is typically formed from a phosphorescent substance that emits broadband light when excited by a blue or ultraviolet emitter is employed together with typical narrow-band blue and yellow LEDs. Within this embodiment, the light produced by the phosphorescent material is a spectrally broadband emission necessary to have a reasonable color rendering index with respect to daylight. The light from the blue and yellow LEDs is then mixed with the broadband light. Different ratios of the blue and yellow LED light in the mixture are used to adjust the color temperature of the overall combination. In a second embodiment, three LEDs are employed, again with at least one of these having a phosphor coating to produce broadband light, one having a blue emission, a second having a yellow emission and a third having an orange emission. Each of these embodiments again describes a lamp employing at least three emissive LEDs, the light from which must be mixed to produce the intended light output. It is important to note that the first embodiment provided within this disclosure employs three LEDs, the colorimetric coordinates of which all are discussed as lying near a single line through CIE chromaticity space. This fact reduces the tendency of the color of the light to shift away from the Planckian Locus if one LED fades faster than another since they lie along a line that is nearly parallel to the Planckian Locus. Unfortunately, this embodiment requires that either the blue or yellow LED be employed with the white LED. Therefore, if the system is not calibrated properly or if one of the LEDs ages at a different rate than another, it is likely that a luminance shift will occur at the point where one LED is turned off and the other is turned on. This has the potential to create a discontinuous change in color temperature as well as a sudden perceptual change in the perceived brightness of the lamp.

Duggal in U.S. Pat. No. 6,841,949, entitled "Color tunable organic electroluminescent light source" also provides for a color tunable lamp. This lamp, however, employs three, independently-addressable, colored light-emitting elements to provide the necessary color range. Once again, the presence of three (e.g., red, green and blue), independently-addressable light-emitting elements within the lamp to allow the lamp to produce light having a range of CIE chromaticity coordinates, requires complex control of the proportion of light from the three, independently-addressable, light-emitting elements to create the exact color coordinates of daylight sources, and factors such as unequal aging of the three lamps makes formation of daylight colors even more difficult. Further, Duggal does not discuss a means for replicating the spectral power distribution of daylight sources through application of the red, green, and blue light-emitting elements.

The use of OLEDs capable of generating different colors of light is well known and devices having three or more colors of light-emitting elements that are either arranged spatially on a single plane as discussed by U.S. Pat. No. 5,294,869 issued to Tang and Littman, entitled "Organic electroluminescent multicolor image display device," or are composed of a number of stacked, individually-addressable emissive layers as has been discussed by U.S. Pat. No. 5,703,436 issued to Forrest et al., entitled "Transparent Contacts for Organic Devices" have been discussed extensively in the literature. It is further known to create an OLED device having four colors of light-emitting elements by employing light-emitting diode devices with color filters filtering at least some of the light-emitting diode devices, as described in US Patent Application US2004/0113875, assigned to Miller et al., and entitled, "Color OLED display with improved power efficiency". However, a simple OLED-based lamp has not been provided that allows the continuous change of light color along a single line within the CIE Chromaticity space and that continually provides light output along this single line, even as the lamp ages and the light output of one of the light-emitting elements degrades at a different rate than another.

Other LED technologies are also known for producing light to be used in general purpose lighting environments. For example, studies have been published that demonstrate the ability to stack multiple layers of quantum dots, the individual layers being tuned to complementary wavelength bands, and thereby achieve the emission of white light. For example, in the article "From visible to white light emission by GaN quantum dots on Si (111) substrate" by B. Damilano et al. (Applied Physics Letter vol. 75, p. 962, 1999), the use of GaN quantum dots on an Si(111) substrate to effect continuous tuning from blue to orange by control of the QD size is demonstrated. A sample containing four stacked planes of differently sized QDs was shown to produce white light, as demonstrated via photoluminescence spectral power distribution. Electroluminescent white light emission was not demonstrated, nor was continuous color tuning with a fixed material set.

US 2006/0043361 by Lee et al., discloses a white light-emitting organic-inorganic hybrid electroluminescence device. The device comprises a hole-injecting electrode, a hole-transport layer, a semiconductor nanocrystal layer, an electron transport layer and an electron-injecting electrode, wherein the semiconductor nanocrystal layer is composed of at least one kind of semiconductor nanocrystals, and at least one of the aforementioned layers emits light to achieve white light emission. The semiconductor nanocrystal layer of this device may also be composed of at least two kinds of nanocrystals having at least one difference in size, composition, structure or shape. Organic materials are employed for the transport layers, whereas inorganic materials are employed for the nanocrystals and the electrodes. While such a device may be used to create white light, it does not address the need to vary the color of this white light source or to control the spectral power distribution of the white light source.

U.S. Pat. No. 7,122,842, by Hill, discloses a light emitting device that produces white light, wherein a series of rare-earth doped group IV semiconductor nanocrystals are either combined in a single layer or are stacked in individual RGB layers to produce white light. In one example, at least one layer of Group II or Group VI nanocrystals receives light emitted by the Group IV rare-earth doped nanocrystals acting as a pump source, the Group II or Group VI nanocrystals then fluorescing at a variety of wavelengths. This disclosure also does not demonstrate color tuning during device operation.

US 2005/0194608, by Chen, discloses a device having a broad spectral power distribution $Al_{(1-x-y)}In_yGa_xN$ white light emitting device which includes at least one blue-complementary light quantum dot emitting layer having a broad spectral power distribution and at least one blue light emitting layer. The blue-complementary quantum dot layer includes plural quantum dots, the dimensions and indium content of which are manipulated to result in an uneven distribution so as to increase the FWHM of the emission of the layer. The blue light-emitting layer is disposed between two conductive cladding layers to form a packaged LED. Various examples are described in which the blue-complementary emission is achieved by means of up to nine emitting layers to provide a broad spectral distribution, and the blue emission is achieved by up to four blue emitting layers. The author also discusses the ability to tune the spectral power distribution and the color temperature of the LED through changing the materials from which the LED is constructed. However, the author does not provide a method for dynamically adjusting the color temperature or spectral power distribution of the device.

There is a need, therefore, for a lamp that provides multiple colors of light output and specifically multiple colors of light output with chromaticity coordinates that lie on or near the Planckian Locus, that is less complex to manufacture, and simpler than the prior art solutions to control while still having the capacity to create light output with an acceptable CRI as compared to standard illumination sources.

SUMMARY OF THE INVENTION

A white-light electro-luminescent lamp has an adjustable spectral power distribution, including a first light-emitting element that emits light within each of three wavelength bands, 1) between 440 and 520 nm, 2) between 520 and 600 nm, and 3) between 600 and 680 nm. An integrated spectral power within the first wavelength band is higher than the second wavelength band and the integrated spectral power within the second wavelength band is higher than the third wavelength band. A second light-emitting element emits light within each of three wavelength bands, 1) between 440 and 520 nm, 2) between 520 and 600 nm, and 3) between 600 and 680 nm. The integrated spectral power within the third wavelength band is higher than the integrated spectral power of the second wavelength band and the integrated spectral power within the second wavelength band is higher than the integrated spectral power within the first wavelength band. A controller modulates the integrated spectral power of the light produced by the first and the second light-emitting elements such that the spectral power distribution of the light formed by combining the light produced by the modulated first and second light-emitting elements is substantially equal to a CIE standard daylight spectral power distribution for correlated color temperatures between 4000K-9500K.

DETAILED DESCRIPTION OF THE INVENTION

Figure 1:
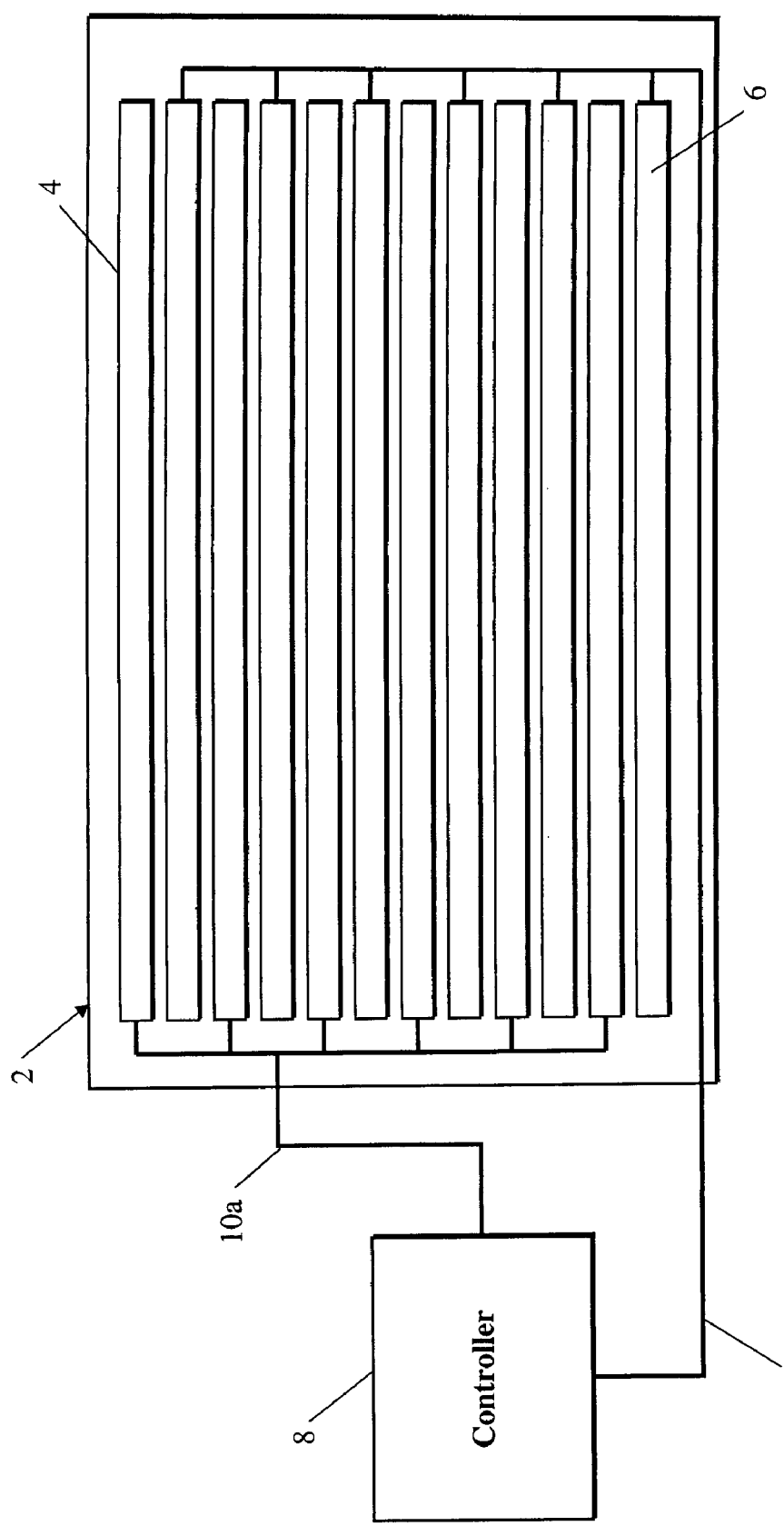
FIG. 1 is schematic diagram of an electro-luminescent lamp according to one embodiment of the present invention.

The present invention provides a white-light, electro-luminescent lamp 2 as shown in FIG. 1, having an adjustable spectral power distribution emission, wherein the spectral power distribution approximates the spectral power distribution of a plurality of standard daylight distributions as specified by the CIE. This lamp 2 includes two light-emitting elements 4, 6. The first light-emitting element 4 emits light within each of three wavelength bands, including a first wavelength band between 440 and 520 nm, a second wavelength band between 520 and 600 nm, and a third wavelength band between 600 and 680 nm; wherein an integrated spectral power within the first wavelength band is higher than the second wavelength band, and the integrated spectral power within the second wavelength band is higher than the third wavelength band. The second light-emitting element 6 emits light within each of three wavelength bands, including a first wavelength band between 440 and 520 nm, a second wavelength band between 520 and 600 nm, and a third wavelength band between 600 and 680 nm; wherein the integrated spectral power within the third wavelength band is higher than the integrated spectral power of the second wavelength band, and the integrated spectral power within the second wavelength band is higher than the integrated spectral power within the first wavelength band. The lamp 2 further includes a controller 8. The controller 8 modulates the integrated spectral power of the first and the second light-emitting element such that a spectral power distribution of the combined first and second light-emitting elements produces a spectral power distribution that is substantially equal to a CIE standard daylight spectral power distribution for correlated color temperatures between 4000K-10000K.

To enable this invention, the two light-emitting elements are designed to create light output with chromaticity coordinates that approximate two points near the blackbody or Planckian locus. Designing the chromaticity coordinates of the first 4 and second 6 light-emitting elements in this way, allows the lamp to produce several desirable colors of light for general illumination by adjusting the ratio of luminance produced by the two light-emitting elements. In fact, any colors of light may be produced whose chromaticities lie along a line connecting the CIE chromaticity coordinates of the two light-emitting elements 4, 6; thereby creating metamers of the desired standard light sources. Important in this invention, the spectral output of the two light-emitting elements may be designed so as to minimize differences in the spectral power distributions between the metamers and their corresponding standard sources, providing a metameric match approximating a radiometric match to the corresponding desired standard illuminant.

Figure 2:
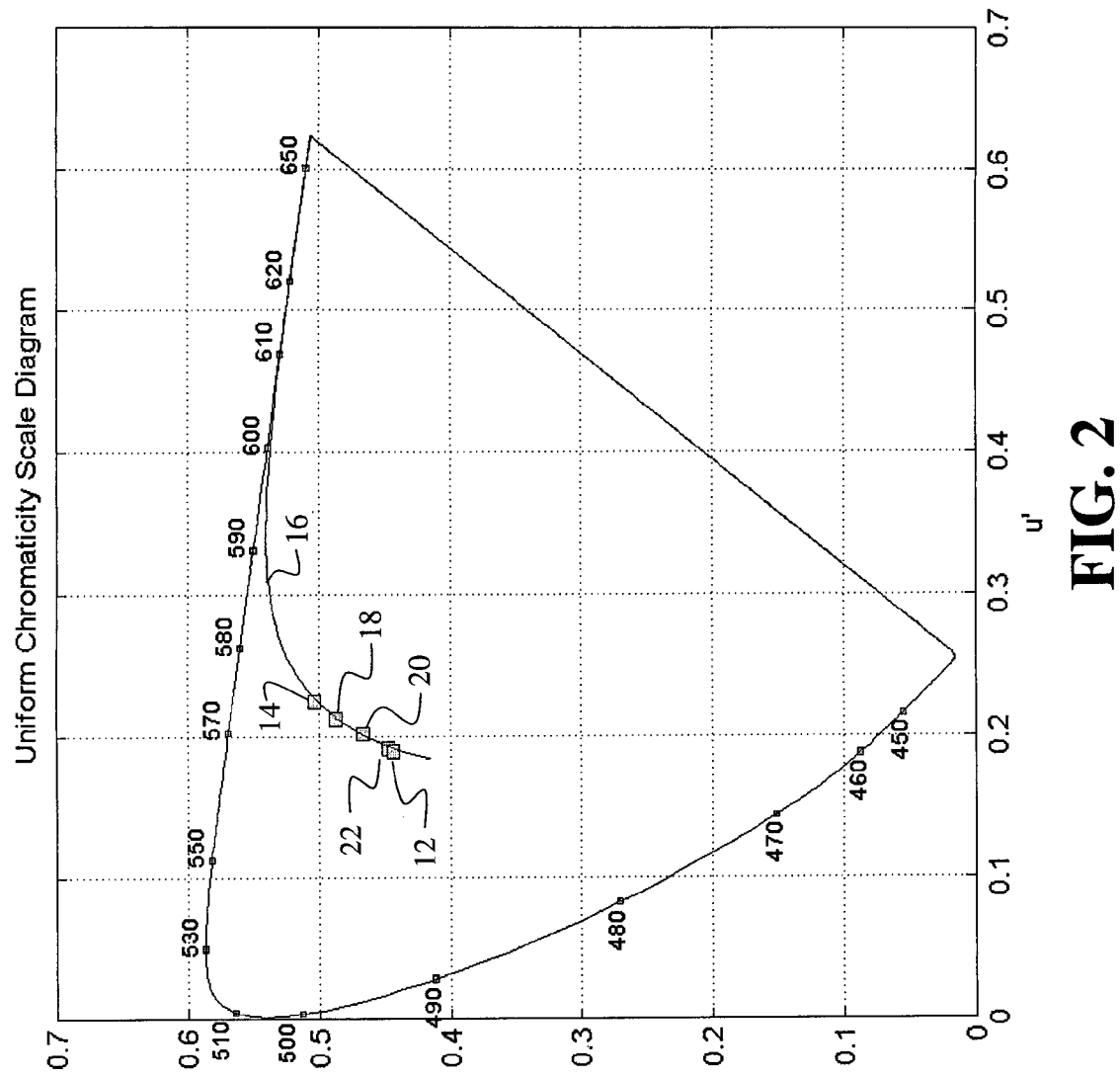
FIG. 2 is a CIE 1976 Uniform Chromaticity Scale diagram showing the color coordinates of two light-emitting elements according to one embodiment of the present invention, the Planckian Locus, and example lamp outputs corresponding to standard lighting sources.

Specifically, a lamp 2 is provided having two light-emitting elements 4, 6 having distinct CIE uniform chromaticity space coordinates as shown in the 1976 CIE uniform chromaticity space diagram of FIG. 2. As shown in this figure, the lamp 2 includes a first light-emitting element 4 for emitting light having u'v' coordinates 12 and a second light-emitting element 6 for emitting light having u'v' coordinates 14, where the pair of u'v' coordinates 12, 14, define the end points of a line that is substantially coincident with a portion of the Planckian locus, indicated by the curve 16, such that points on the line are within 0.05 chromaticity units of multiple points on the Planckian locus. Notice also, that standardized daylight light sources also lie on or near this line, including various standardized daylight light sources corresponding to various color temperatures, including 5000K 18, 6500K 20 and 9300K 22. These daylight light sources are at times referred to as D50, D65 and D93 respectively. Notice that as shown in FIG. 2 the portion of the Planckian locus 16 near these daylight light sources is relatively straight and, therefore, by adjusting the proportion of integrated radiometric power within the visible spectrum and, therefore, the luminance produced by each of the two light-emitting elements, it is possible for the lamp 2 of the present invention to produce a range of light attaining u'v' coordinates that are substantially equal to the u'v' coordinates of these typical daylight light sources by simply changing the proportion of the integrated radiometric power within the visible spectrum, and therefore, the luminance produced by the light-emitting elements 4 and 6 to select a color of light on the line joining their u'v' coordinates 12, 14.

Figure 3:
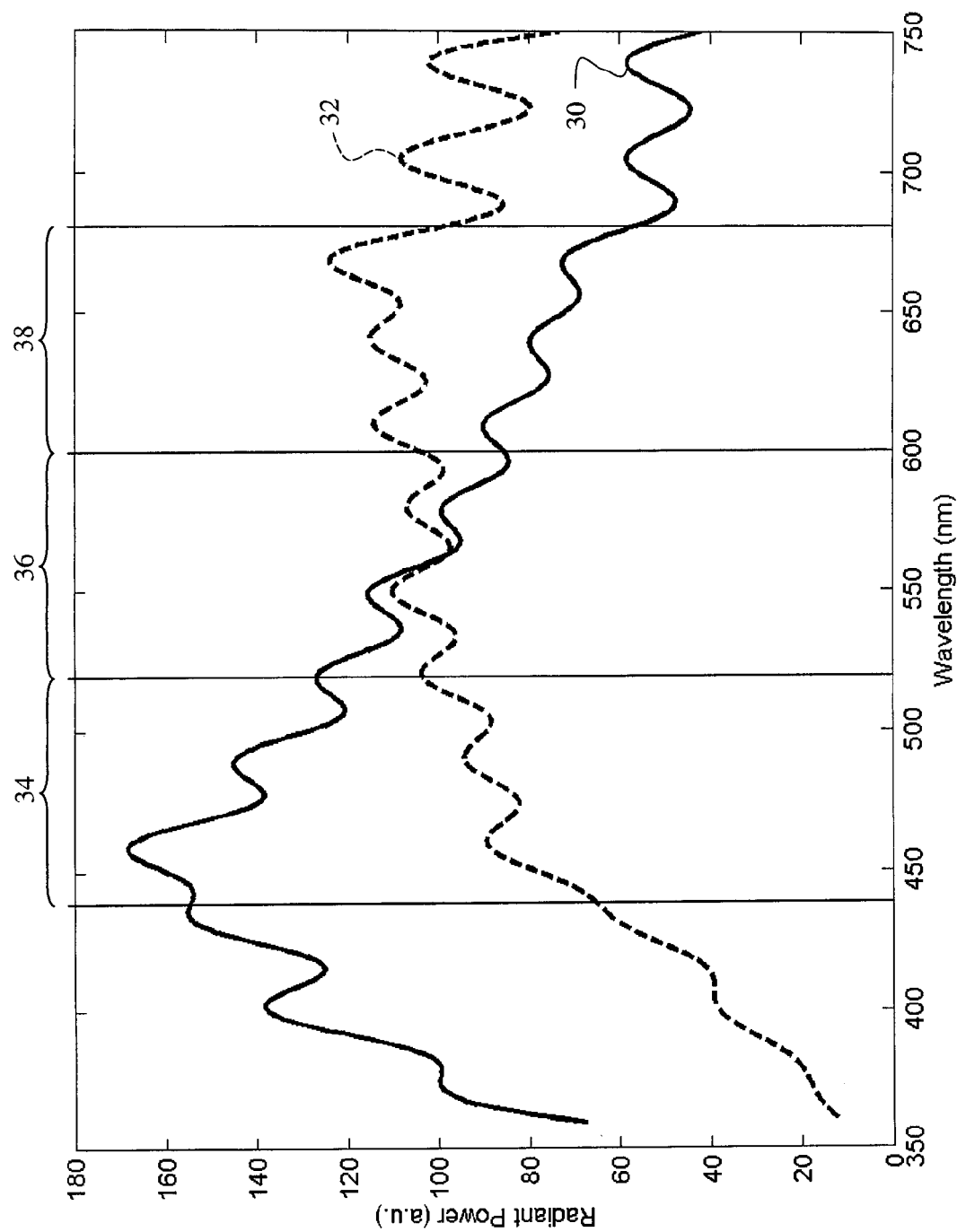
FIG. 3 is a graph showing the spectral power distributions of the two light-emitting elements whose uniform chromaticity scale coordinates are depicted in FIG. 2.

Although the first and second light-emitting elements will generally each provide a color that can be mixed to provide the intermediate color values of the daylight emitters, it is possible to provide several such pairs of light-emitting elements as described in co-filed, co-pending docket 93,681, which is herein included by reference. In many lighting applications, however, it is not only important that the light output by a lamp to produces the same color as standard illuminants, but often such a lamp desirably produces a near match to the spectral power distribution of the desired light source. Without this near spectral match a high degree of light-source metamerism can occur, wherein the color stimuli rendered for reflective (or transmissive) objects are quite inconsistent in appearance with standard light source renderings. The authors have shown that by designing the spectral power distribution of the first 4 and second 6 light-emitting elements of the lamp appropriately, not only can the same color of light be achieved as for each of the standard illuminants, but it is further possible to achieve a near match to the spectral power distributions of standard daylight illuminants; thus providing the ability to render color stimuli consistent with that of standard light sources. To achieve the desired spectral power distributions, it is important that the radiant power of the first light-emitting element 4 generally decrease as a function of wavelength from 440 to 680 nm and the radiant power of the second light-emitting element 6 increases as a function of wavelength from 440 to 680 nm. FIG. 3 shows an example spectral power distribution 30 for the first light-emitting element 4 and an example spectral power distribution 32 for the second light-emitting element 6, which generally fulfill this requirement and provide light having the chromaticity coordinates 12, 14 as shown in FIG. 2. While these two spectral power distributions follow this general trend, each of these spectral power distributions oscillate about a general trend line and therefore exhibit local maxima and minima around this trend line.

However, the invention only requires that the peak amplitudes of the local maxima decrease as a function of wavelength from 440 and 680 nm for the first light-emitting element 4 and decrease as a function of wavelength from 440 nm and 680 nm for the second light-emitting element 6. Particularly important in this invention is that the first light-emitting element 4 emits light within each of three wavelength bands, including a first wavelength band 34 between 440 and 520 nm, a second wavelength band 36 between 520 and 600 nm, and a third wavelength band 38 between 600 and 680 nm; wherein the integrated spectral power within the first wavelength band is higher than the second wavelength band and the integrated spectral power within the second wavelength band is higher than the third wavelength band. For the spectral power distribution 30 shown in FIG. 3, the integrated radiant power is 11,633, 8390, and 6187 units for each of these three wavelength bands, respectively. Also the second light-emitting element 6 emits light within each of three wavelength bands, including a first wavelength band 34 between 440 and 520 nm, a second wavelength band 36 between 520 and 600 nm, and a third wavelength band 38 between 600 and 680 nm; wherein the integrated spectral power within the third wavelength band 38 is higher than the integrated spectral power of the second wavelength band 36, and the integrated spectral power within the second 36 wavelength band is higher than the integrated spectral power within the first wavelength band 34. For the spectral power distribution 32 shown in FIG. 3, the integrated radiant power is 6347, 8323, and 10193 for the first, second and third wavelength bands, respectively.

To demonstrate that when the spectral power distribution shown in FIG. 3 are combined, they form good matches to the spectral power distributions of typical daylight illuminants, Table 1 provides the correlated color temperatures of several standard daylight illuminants and the CRI value computed as specified in the above mentioned reference. As shown in Table 1, by modifying the ratio of the light output from these two light-emitting elements, CRIs of 80 or greater can be achieved for each of the illuminants having the daylight color temperatures shown in this table.

TABLE 1

| Color Temperature (deg K) | CRI |
|---|---|
| 4000 | 94 |
| 4500 | 96 |
| 5000 | 89 |
| 5500 | 87 |
| 6000 | 86 |
| 6500 | 87 |
| 7000 | 88 |
| 7500 | 89 |
| 8000 | 90 |
| 8500 | 90 |
| 9000 | 90 |
| 9300 | 90 |
| 9500 | 97 |

Figure 4:
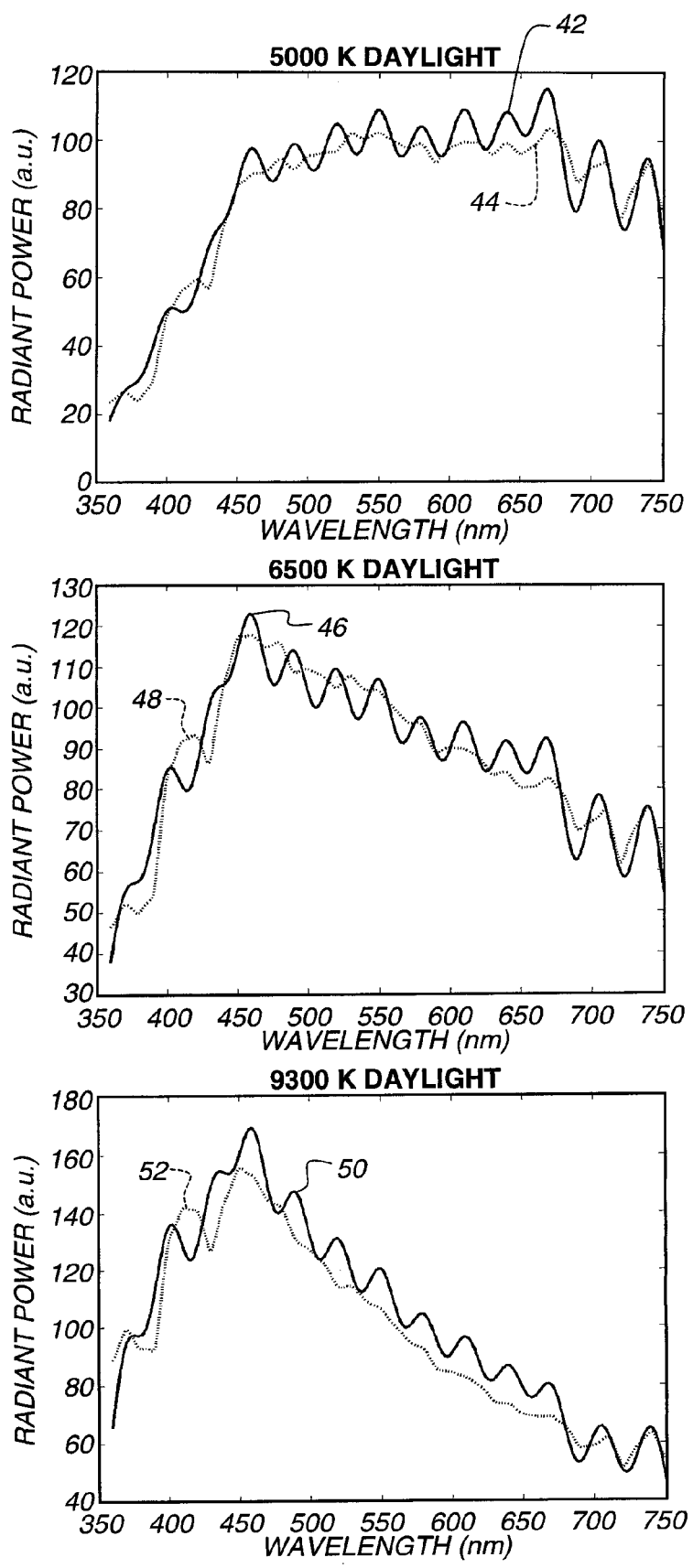
FIG. 4 is a group of graphs showing aim and actual spectral power distributions for various combinations of the two light-emitting elements for which spectra are shown in FIG. 3.

To further exemplify the fit provided to the spectral power distributions of the combinations of these two light sources to standard daylight sources, FIG. 4 shows the spectral power distributions obtained by combining the spectral power distributions of the two light-emitting elements 30, 32. These are indicated by the solid lines 42, 46, and 50 for correlated color temperatures of 5000K, 6500K and 9300K respectively. Also shown are the standard daylight spectral power distributions for these correlated color temperatures, indicated by the dotted lines 44, 48, and 52. As shown, a reasonable spectral match is obtained for each correlated color temperature, wherein each pair has an overall spectral power distribution quite different from the other two.

For the present invention, a light-emitting element is defined as any independently addressable element that emits light. That is, the controller must be able to provide a separate signal (e.g., a separate voltage or current) to each of the two light-emitting elements. This is illustrated in FIG. 1 by the two signal control lines 10a and 10b, each of which provides a separate signal from the controller 8 to each of the first 4 and second 6 light-emitting elements. Within the illustrated embodiments of the present invention it will be illustrated that multiple species of emitters (e.g., multiple sizes of quantum dots) may be required to form the spectral power distribution for each of the first 4 and second 6 light-emitting elements. In accordance with the present definition, it is not necessary that all of these species of emitters that form the spectral power distribution of the light-emitting elements be provided between a single pair of segmented electrodes, as long as all of the species emit when the controller provide a single control signal to the lamp 2.

One method of obtaining the spectral power distributions shown in FIG. 3 is to utilize a coatable inorganic light-emitting diode employing quantum dots as described in co-pending docket 91,064, which is hereby included by reference. Within such a device, numerous types of quantum dots may be employed to form a plurality of different species of emitters.

Figure 5:
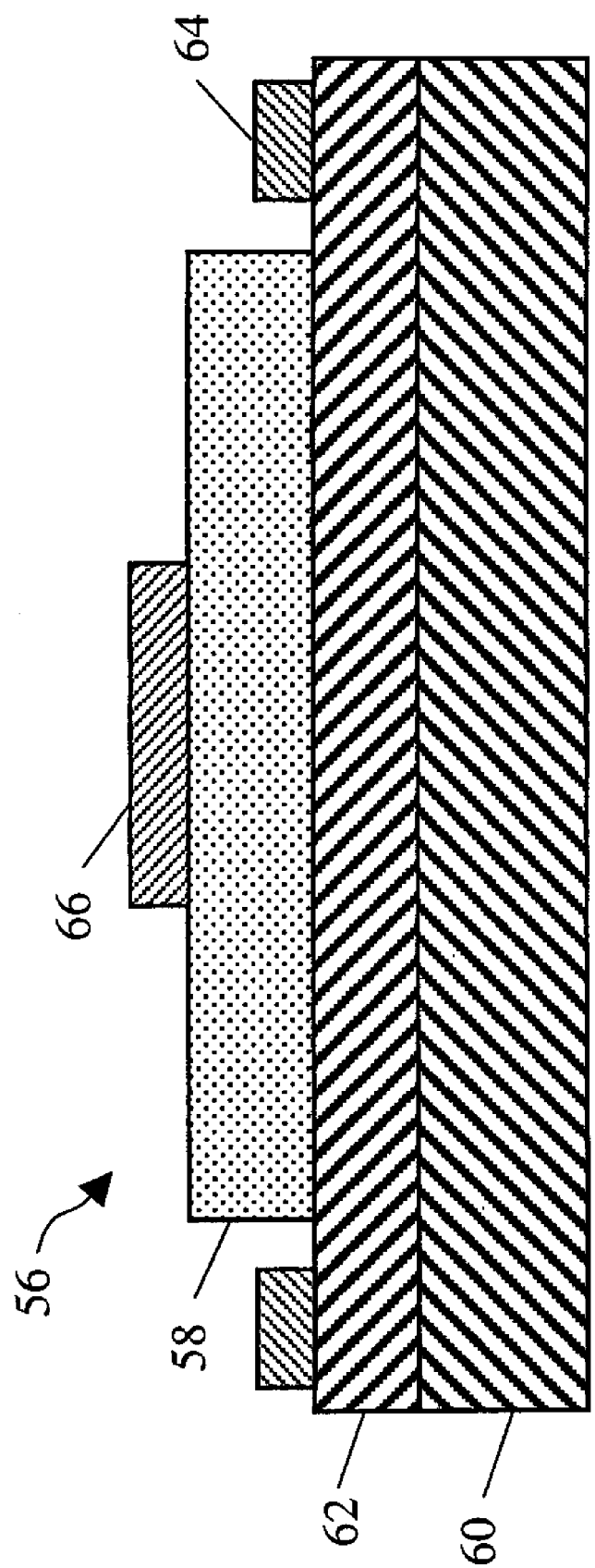
FIG. 5 is a cross-sectional diagram of an inorganic light-emitting diode useful in practicing the present invention.

FIG. 5 shows a cross sectional view of a coated inorganic electro-luminescent light-emitting element useful in practicing the present invention. As shown in this figure, the electro-luminescent device 56 incorporates the quantum dot inorganic light-emitting layer 58. A substrate 60 supports the deposited semiconductor and metal layers; its only requirements are that it is sufficiently rigid to enable the deposition processes and that it can withstand the thermal annealing processes (maximum temperatures of ~285° C.). It can be transparent or opaque. Possible substrate materials are glass, silicon, metal foils, and some plastics. The next deposited material is an anode 62. For the case where the substrate 60 is p-type Si, the anode 62 needs to be deposited on the bottom surface of the substrate 60. A suitable anode metal for p-Si is Al. It can be deposited by thermal evaporation or sputtering. Following its deposition, it will preferably be annealed at ~430° C. for 20 minutes. For all of the other substrate types named above, the anode 62 is deposited on the top surface of the substrate 60 and is comprised of a transparent conductor, for example, indium tin oxide (ITO). Sputtering or other well-known procedures in the art can deposit the ITO. The ITO is typically annealed at ~300° C. for one hour to improve its transparency. Because the sheet resistance of transparent conductors, such as, ITO, are much greater than that of metals, bus metal 64 can be selectively deposited through a shadow mask using thermal evaporation or sputtering to lower the voltage drop from the contact pads to the actual device. Next is deposited the inorganic light emitting layer 58. It can be dropped or spin cast onto the transparent conductor (or Si substrate). Other deposition techniques, for example, inkjetting the quantum dot-inorganic nanoparticle dispersion is also possible. Following the deposition, the inorganic light-emitting layer 58 is annealed at a preferred temperature of 270° C. for 50 minutes. Lastly, a cathode 66 metal is deposited over the inorganic light-emitting layer 58. Candidate cathode 66 metals are ones that form an ohmic contact with the material comprising the inorganic nanoparticles in the light-emitting layer 58. For example, in a case where the quantum dots are formed from ZnS inorganic nanoparticles, a preferred metal is Al. It can be deposited by thermal evaporation or sputtering, followed by a thermal anneal at 285° C. for 10 minutes. Although not shown in FIG. 5, a p-type transport layer and an n-type transport layer may be added to the device to surround the inorganic light-emitting layer 58. As is well-known in the art, LED structures typically contain doped n- and p-type transport layers. They serve a few different purposes. Forming ohmic contacts to semiconductors is simpler if the semiconductors are doped. Since the light emitter layer is typically intrinsic or lightly doped, it is much simpler to make ohmic contacts to the doped transport layers. As a result of surface plasmon effects, having metal layers adjacent to light emitter layers results in a loss of emitter efficiency. Consequently, it is advantageous to space the light emitter layers from the metal contacts by sufficiently thick (at least 150 nm) transport layers. Finally, not only do the transport layers inject electron and holes into the light emitter layer, but, by proper choice of materials, they can prevent the leakage of the carriers back out of the light emitter layer. For example, if the inorganic quantum dots in the light-emitting layer 58 were composed of $ZnS_{0.5}Se_{0.5}$ and the transport layers were composed of ZnS, then the electrons and holes would be confined to the light emitter layer by the ZnS potential barrier. Suitable materials for the p-type transport layer include II-VI and III-V semiconductors. Typical II-VI semiconductors are ZnSe, ZnS, or ZnTe. Only ZnTe is naturally p-type, while ZnSe and ZnS are n-type. To get sufficiently high p-type conductivity, additional p-type dopants should be added to all three materials. For the case of II-VI p-type transport layers, possible candidate dopants are lithium and nitrogen. For example, it has been shown in the literature that $Li_3N$ can be diffused into ZnSe at ~350° C. to create p-type ZnSe, with resistivities as low as 0.4 ohm-cm.

Suitable materials for the n-type transport layer include II-VI and III-V semiconductors. Typical II-VI semiconductors are ZnSe or ZnS. As for the p-type transport layers, to get sufficiently high n-type conductivity, additional n-type dopants should be added to the semiconductors. For the case of II-VI n-type transport layers, possible candidate dopants are the Type III dopants of Al, In, or Ga. As is well known in the art, these dopants can be added to the layer either by ion implantation (followed by an anneal) or by a diffusion process. A more preferred route is to add the dopant in-situ during the chemical synthesis of the nanoparticle. Taking the example of ZnSe particles formed in a hexadecylamine (HDA)/TOPO coordinating solvent, the Zn source is diethylzinc in hexane and the Se source is Se powder dissolved in TOP (forms TOPSe). If the ZnSe were to be doped with Al, then a corresponding percentage (a few percent relative to the diethylzinc concentration) of trimethylaluminum in hexane would be added to the syringe containing TOP, TOPSe, and diethylzinc. In-situ doping processes like these have been successfully demonstrated when growing thin films by a chemical bath deposition. It should be noted the diode could also operate with only a p-type transport layer or an n-type transport layer added to the structure. Those skilled in the art can also infer that the layer composition can be inverted, such that, the cathode 66 is deposited on the substrate 60 and the anode 62 is formed on the p-type transport layer. For the case of Si supports, the substrate 60 is n-type Si.

The light-emitting layer 58 will preferably be comprised of a plurality of light-emitting cores, each core having a semiconductor material that emits light in response to a recombination of holes and electrons, each such light emitting core defining a first bandgap; a plurality of semiconductor shells formed respectively about the light emitting cores to form core/shell quantum dots, each such semiconductor shell having a second bandgap wider than the first bandgap; and a semiconductor matrix connected to the semiconductor shells to provide a conductive path through the semiconductor matrix and to each such semiconductor shell and its corresponding light-emitting core so as to permit the recombination of holes and electrons.

At least one of the two electrodes (i.e., anode 62 or cathode 66) will typically be formed of a transparent or semi-transparent material such as ITO or IZO. The opposing electrode will often be formed of a highly reflective material such as aluminum or silver, but may also be transparent. In a typical embodiment, the anode will be transparent and the cathode will be reflective, but the opposing structure is also viable. The hole and electron transport materials may be formed from inorganic semi-conducting materials as described above, but may also be formed from organic semi-conducting materials. Additional layers may also be placed into the structure to promote other functions, such as electron and hole injection from the electrodes or electron or hole blocking layers to prevent electrons or holes from traveling past the light-emitting layer to recombine with oppositely charged particles near one of the electrodes.

Some devices constructed using inorganic quantum dots, as described, have bandwidths of approximately 30 nm. Therefore, it is necessary to embed a variety of quantum dots employing different materials or, preferably, different sizes in a device to construct a spectral power distribution of the present invention as illustrated in FIG. 3. In fact, each of the spectral power distributions for the two light-emitting elements shown in FIG. 3 were constructed from a group of 13, 30 nm wide spectral power distributions having Gaussian distributions with peaks at 370, 401, 432, 460, 490, 520, 550, 580, 610, 640, 670, 705, and 740 nm. Therefore, in such a device structure it is important that the light-emitting layer include numerous types of quantum dots to provide different species of emitters.

Figure 6:
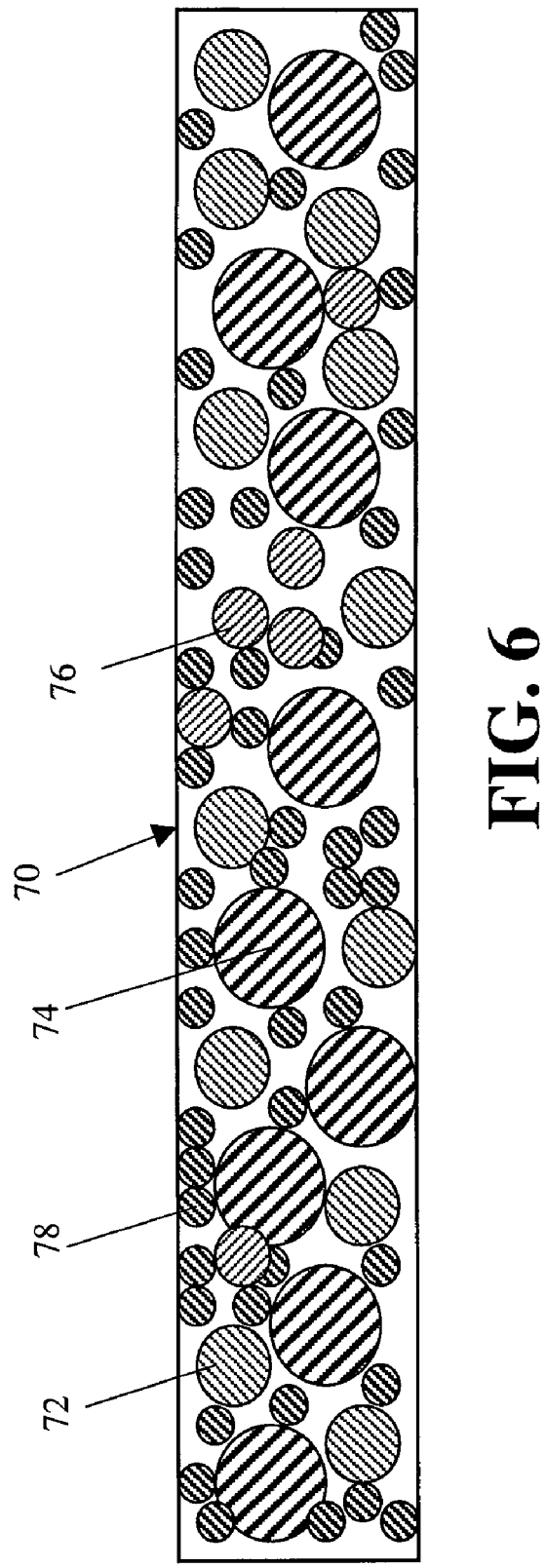
FIG. 6 is a cross-sectional diagram of an inorganic light-emitting layer from a diode useful in practicing the present invention.

The creation of such a light-emitting layer employing inorganic quantum dots will generally involve synthesizing multiple species of light-emitting particles, such as quantum dots of at least a first, second and third size, within separate steps and then depositing these quantum dots in the correct proportion into the light-emitting layer of a device. Note that the three different types of quantum dots will often be required to provide light emission within the three wavelength bands of the present invention. One such light-emitting layer is shown in FIG. 6. As shown in this figure, the light-emitting layer 70 is comprised of at least a first type of quantum dot 72, a second type of quantum dot 74, and a third type of quantum dot 76. Each of these quantum dots will typically differ in size or material composition. In addition to these quantum dots, the light-emitting layer may further include additional conducting elements 78 for improving the electrical contact between the quantum dots and the surrounding connector layers or electrical contacts 62, 66.

Although each of the light-emitting elements employs numerous species of emitters, the creation of such a lamp through this process is much simpler and cost effective than constructing a lamp from individual LEDs as discussed in some prior art embodiments. Once the light-emitting elements have been designed, the species of light-emitting elements may be either mixed or coated in a single step or they may be coated in subsequent steps to form a layered device. However, this process does not require the sorting or manipulation of multiple devices as would by typical in the construction of lamps from individual, discrete LEDs, allowing such coatable devices to be manufactured at a fraction of the cost of lamps manufactured from arrays of discrete LEDs.

Figure 7:
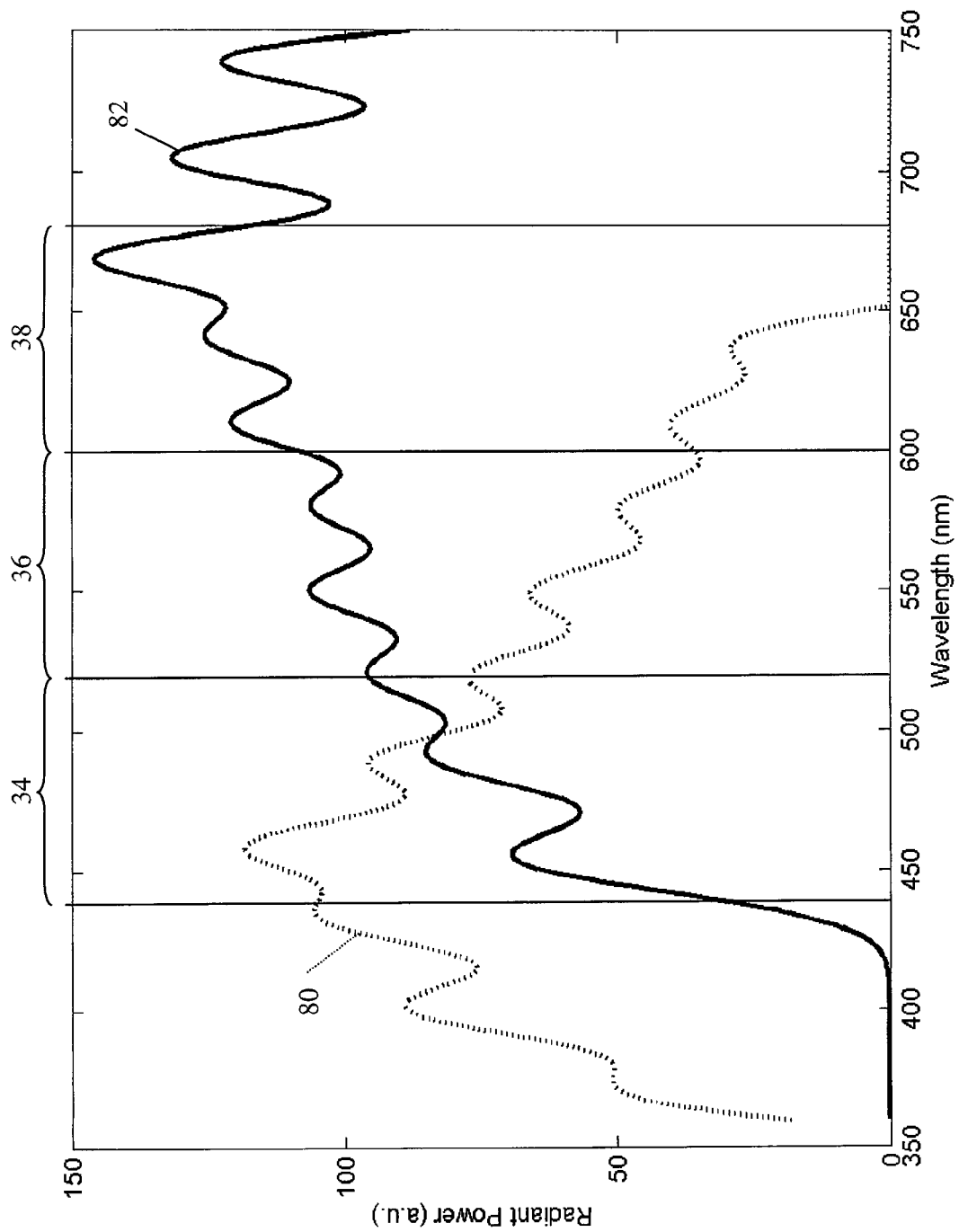
FIG. 7 is a graph of the spectral power distributions for two light-emitting elements useful in practicing the present invention.

The previous example employed two light-emitting elements, each employing the same thirteen species of emitters. However, it is not required, and typically not preferred, that the two light-emitting elements employ the same species or numbers of emitters. In another embodiment, one light-emitting element will employ one group of species of emitters, while the second light-emitting element will employ a group of different species of emitters. In such an example, the first light-emitting element may provide ten species of emitters having a bandwidth with a full width at half maximum of 30 nm and center wavelengths of 370, 401, 432, 460, 490, 520, 550, 580, 610, and 640 nm. The second light-emitting element may employ a group of 10 species of emitters, including species of emitters having a bandwidth with a full width at half maximum of 30 nm and center wavelengths of 455, 490, 520, 550, 580, 610, 640, 670, 705, and 740 nm. Note that some of these species of emitters that comprise the two light-emitting elements have the same bandwidth and center frequencies and may, therefore, be the same species of emitter. However, others do not have the center frequency and are therefore not the same species. The resulting spectral power distribution for these two light-emitting elements is shown in FIG. 7. FIG. 7 shows the spectral power distribution for the first light-emitting element 80.

As in the previous example, note that the peak amplitude of the local maxima decreases as a function of wavelength between 440 and 680 nm for the first light-emitting element 4. Also shown in FIG. 7 is the spectral power distribution for the second light-emitting element 82. The peak amplitude of the local maximum in the radiant power decreases as a function wavelength between 440 nm and 680 nm for this second light-emitting element 6. Particularly important in this invention is that the first light-emitting element 4 emits light within each of three wavelength bands, including a first wavelength band 34 between 440 and 520 nm, a second wavelength band 36 between 520 and 600 nm, and a third wavelength band 38 between 600 and 680 nm; wherein the integrated spectral power within the first wavelength band 34 is higher than the second wavelength band 36, and the integrated spectral power within the second wavelength band 36 is higher than the third wavelength band 38. For the spectral power distribution 80 shown in FIG. 7, the integrated radiant power is 7619, 4384, and 1505 units for each of these three wavelength bands, respectively. Also, the second light-emitting element 6 emits light within each of three wavelength bands, including a first wavelength band 34 between 440 and 520 nm, a second wavelength band 36 between 520 and 600 nm, and a third wavelength band 38 between 600 and 680 nm wherein the integrated spectral power within the third wavelength band 38 is higher than the integrated spectral power of the second wavelength band 36 and the integrated spectral power within the second wavelength band 36 is higher than the integrated spectral power within the first wavelength band 34. For the spectral power distribution 82 shown in FIG. 7, the integrated spectral power is 5803, 8076, and 10021 for the first, second and third wavelength bands, respectively.

Figure 8:
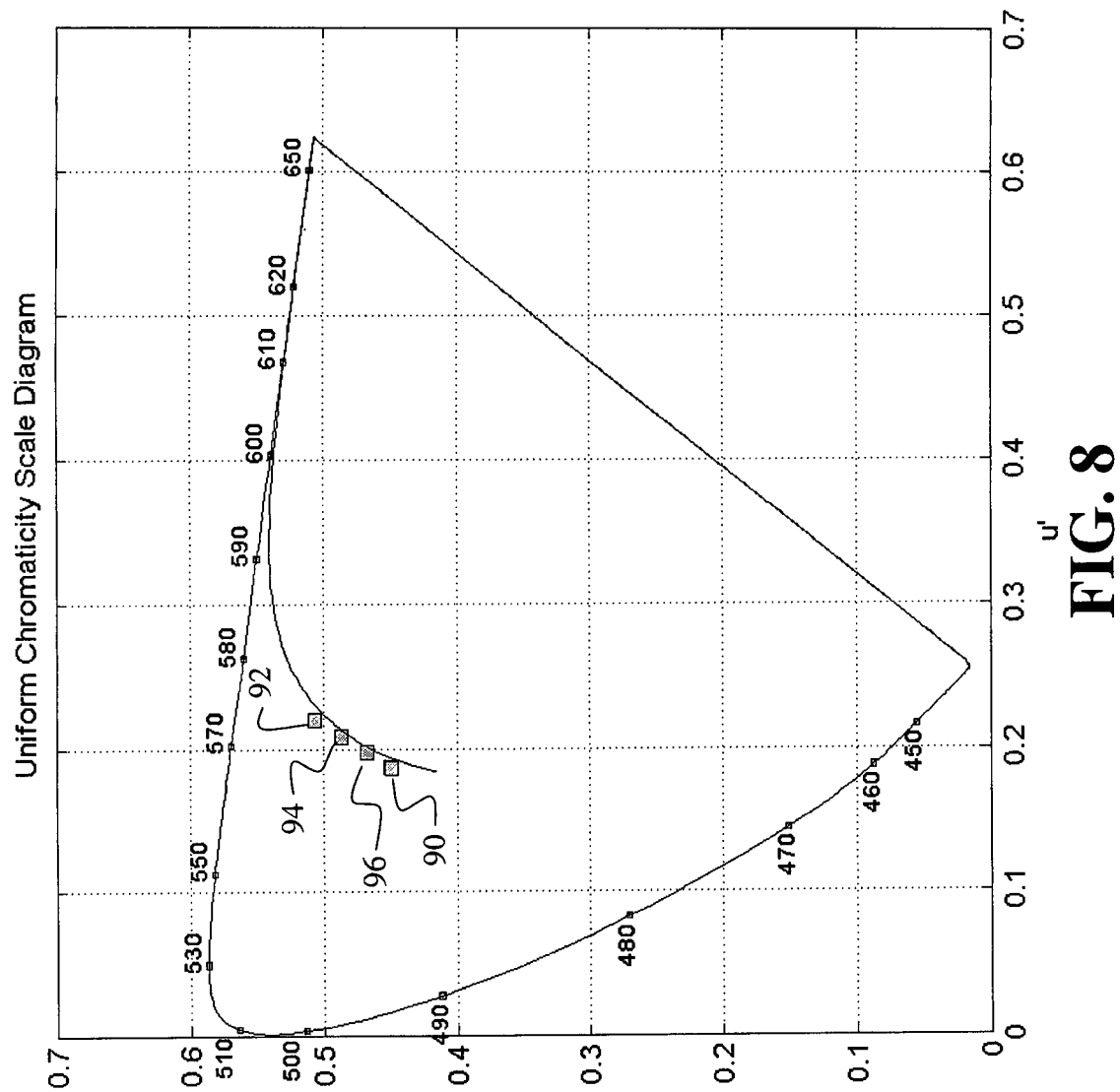
FIG. 8 is a CIE 1976 Uniform Chromaticity Scale diagram showing the color coordinates of two light-emitting elements having the spectral power distributions shown in FIG. 7, the Planckian Locus, and example lamp outputs corresponding to standard lighting sources.

These two spectral power distributions may be combined to create spectral power distributions, which come very close to each of the standard daylight distributions having correlated color temperatures between 4000 and 9500 degrees K. This fact is supported by the CRI values shown in Table 2. Note that as before, all of these values are 80 or greater and, in fact, the minimum value is 85. While the two light-emitting elements may be combined to create spectral power distributions that are very close to the spectral power distributions of each of the corresponding daylight illuminants, their colorimetric coordinates do not necessarily lie precisely on the blackbody curve as shown in FIG. 8. This figure shows the 1976 CIE uniform chromaticity scale coordinates for the first light-emitting element 90, as well as the 1976 CIE uniform chromaticity scale coordinates for the second light-emitting element 92. Note that these points lie very near, but not directly on the blackbody curve. By combining these light-emitting elements colors, it is possible to form light sources whose colors are very near the daylight illuminants having correlated color temperatures between 9500 and 4000 degrees Kelvin. For example, colors near D50 94 and D65 96 are shown. Also plotted is the resulting color that lies near D93, however, this color location is practically indistinguishable from the color coordinate of the first light-emitting element 90.

TABLE 2

| Color Temperature (deg K) | CRI |
| --- | --- |
| 4000 | 85 |
| 4500 | 94 |
| 5000 | 96 |
| 5500 | 96 |
| 6000 | 97 |
| 6500 | 97 |
| 7000 | 97 |
| 7500 | 95 |
| 8000 | 93 |

TABLE 2-continued

| Color Temperature (deg K) | CRI |
|---|---|
| 8500 | 91 |
| 9000 | 89 |
| 9300 | 88 |
| 9500 | 87 |

Figure 9:
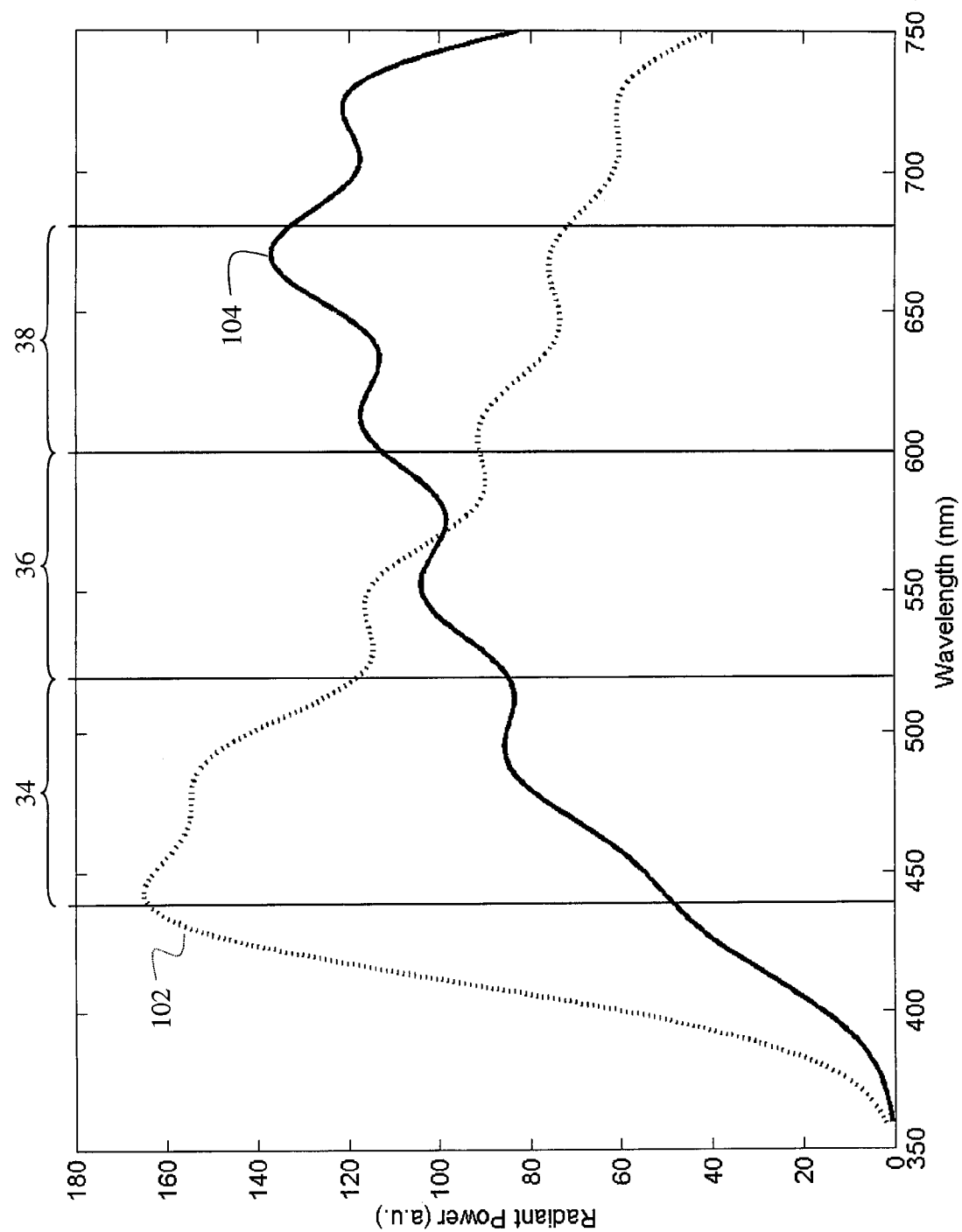
FIG. 9 is a graph of the spectral power distributions for two light-emitting elements useful in practicing the present invention.

Although the first two examples have employed light-emitting elements comprised of numerous species of emitters, each having a 30 nm bandwidth, it is possible, and under some conditions, desirable that the two light-emitting elements 4, 6 be composed of species of emitters which provide a wider bandwidth of light emission. In yet another embodiment, the two light-emitting elements may be comprised of numerous species of emitters having broader bandwidths. For example, desirable spectral power distribution for each light-emitting element may be formed from numerous species of emitters, wherein each species of emitters have a bandwidth of 60 nm and have peak emission at 435, 490, 550, 610, and 730 nm, to form the spectral power distributions shown in FIG. 9. Included in FIG. 9 is the spectral power distribution for the first light-emitting element 102 and the spectral power distribution for the second light-emitting element 104. As shown in FIG. 9, the local maxima in the radiant power decreases monotonically such that the overall envelope monotonically decreases for the first light-emitting element 102 as a function of wavelength between 440 and 680. The local maxima in the radiant power for the second light-emitting element 104 decreases as a function of wavelength between 680 nm and 440 nm for this second light-emitting element 6. Particularly important in this invention is that the first light-emitting element 4 emits light within each of three wavelength bands, including a first wavelength band 34 between 440 and 520 nm, a second wavelength band 36 between 520 and 600 nm, and a third wavelength band 38 between 600 and 680 nm wherein the integrated spectral power within the first wavelength band 34 is higher than the integrated spectral power for the second wavelength band 36 and the integrated spectral power within the second wavelength band 36 is higher than the integrated spectral power within the third wavelength band 38. For the spectral power distribution 102 shown in FIG. 9, the integrated radiant power is 12066, 8517, and 6455 units for each of these three wavelength bands, respectively. Also, the second light-emitting element 6 emits light within each of three wavelength bands, including a first wavelength band 34 between 440 and 520 nm, a second wavelength band 36 between 520 and 600 nm, and a third wavelength band 38 between 600 and 680 nm wherein the integrated spectral power for the spectral power distribution 104 within the third wavelength band 38 is higher than the integrated spectral power of the second wavelength band 36 and the integrated spectral power within the second wavelength band 36 is higher than the integrated spectral power within the first wavelength band 34. For the spectral power distribution 104 shown in FIG. 9, the integrated spectral power is 5952, 8072, and 9885 for the first, second and third wavelength bands, respectively.

Note that while devices can be created from species of emitters having narrow bandwidths, such as 30 nm bandwidths, it will generally be possible to employ fewer species of emitters with broader bandwidths to create a continuous spectra as is required for each of the light-emitting elements of the present invention. However, there is a limit to this trend as broader band species do not enable the selectivity that is necessary to create the most desired spectral shapes. Generally, the most preferred species of emitters will have bandwidths of between 30 and 120 nm.

As in the earlier embodiments, light from two light-emitting elements 4, 6, which employ the spectral power distributions 102, 104 can be combined in appropriate ratios to provide a good fit to the standard daylight spectral power distributions having correlated color temperatures between 4000 and 9500 degrees Kelvin. This is again demonstrated with the CRI, as shown in Table 3. Once again, it can be seen that all CRI values are greater than 80, for each of these daylight spectral power distributions.

TABLE 3

| Color Temperature (deg K) | CRI |
|---|---|
| 4000 | 90 |
| 4500 | 88 |
| 5000 | 84 |
| 5500 | 83 |
| 6000 | 84 |
| 6500 | 86 |
| 7000 | 88 |
| 7500 | 88 |
| 8000 | 88 |
| 8500 | 86 |
| 9000 | 83 |
| 9300 | 81 |
| 9500 | 97 |

Figure 10:
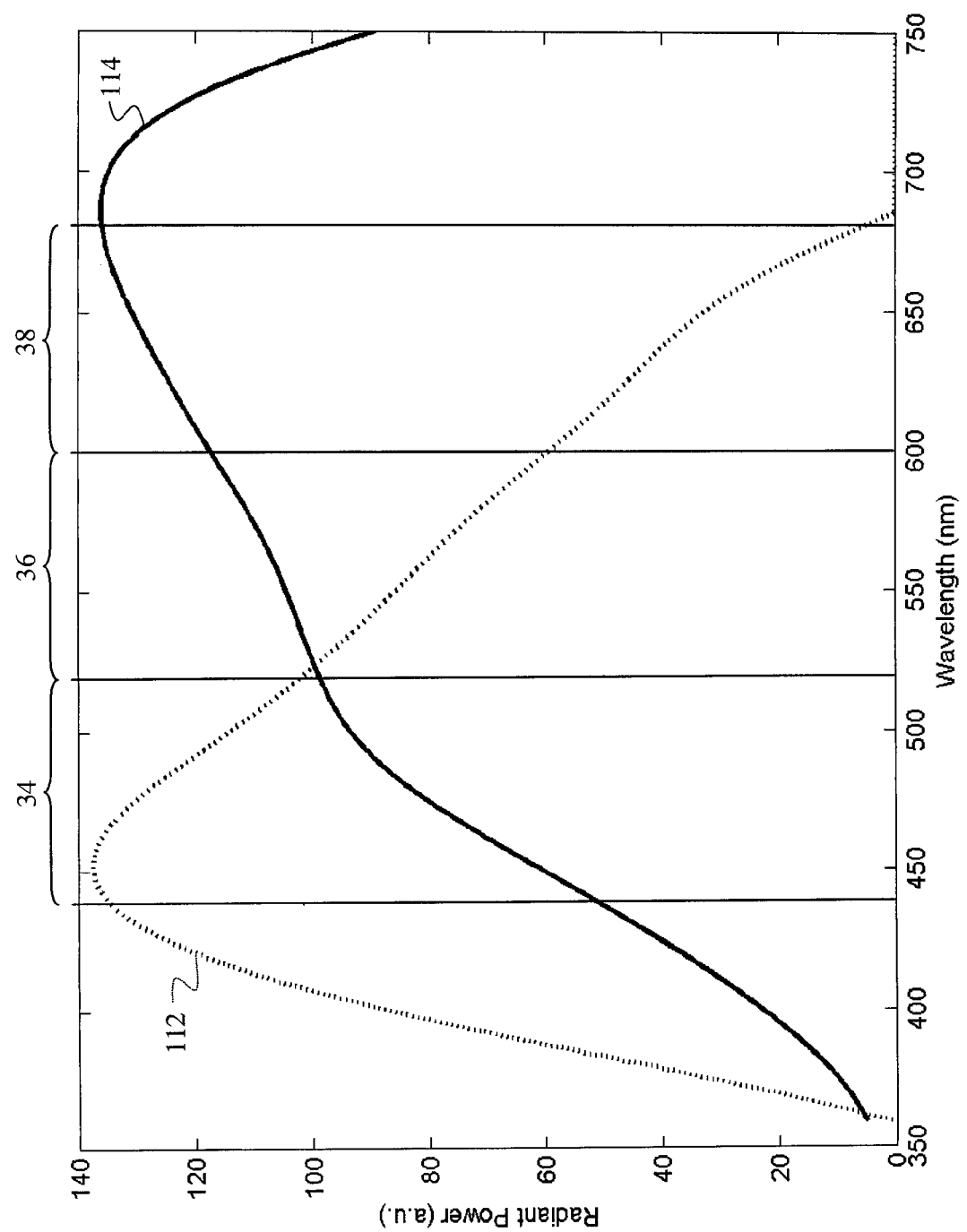
FIG. 10 is a graph of the spectral power distributions for two light-emitting elements useful in practicing the present invention.

It is further possible to employ species of emitters with even broader spectral power distributions. For instance, it is known that organic light-emitting diodes often have bandwidths on the order of 90 nm. Such materials may also be employed within an embodiment of the present invention to create, for example, light-emitting elements having a spectral power distribution as shown in FIG. 10. As shown in FIG. 10, the amplitude of the spectral power distribution for the first light-emitting element 112 decreases as a function of wavelength between 450 and 680. The amplitude of the spectral power distribution for the second light-emitting element 114 decreases as a function of wavelength between 440 nm and 680 nm for this second light-emitting element 6. Particularly important in this invention is that the first light-emitting element 4 emits light within each of three wavelength bands, including a first wavelength band 34 between 440 and 520 nm, a second wavelength band 36 between 520 and 600 nm, and a third wavelength band 38 between 600 and 680 nm wherein the integrated spectral power within the first wavelength band is higher than the integrated spectral power within the second wavelength band and the integrated spectral power within the second wavelength band is higher than the integrated spectral power within the third wavelength band. For the spectral power distribution 112 shown in FIG. 10, the integrated radiant power is 10087, 6538, and 2939 units for each of these three wavelength bands, respectively. Also, important is that the second light-emitting element 6 emits light within each of three wavelength bands, including a first wavelength band 34 between 440 and 520 nm, a second wavelength band 36 between 520 and 600 nm, and a third wavelength band 38 between 600 and 680 nm wherein the integrated spectral power for the spectral power distribution 114 within the third wavelength band is higher than the integrated spectral power of the second wavelength band and the integrated spectral power within the second wavelength band is higher than the integrated spectral power within the first wavelength band. For the spectral power distribution 114 shown in FIG. 10, the integrated radiant power is 6505, 8662, and 10344 for the first, second and third wavelength bands, respectively. Combining five species of emitters having 90 nm bandwidths, with spectral power distributions having center frequencies of 410, 465, 525, 585, and 655 nm, forms the spectral power distribution 112. Combining six 90 nm bandwidth emitter spectral power distributions having center frequencies of 430, 490, 550, 610, 670, and 730 nm forms the spectral power distribution 114.

Once again, light from two light-emitting elements 4, 6, which employ the spectral power distributions 112, 114 can be combined in appropriate ratios to provide a good fit to the standard daylight spectral power distributions having correlated color temperatures between 4000 and 9500 degrees Kelvin. This is again demonstrated with the CRI, as shown in Table 4. Once again, it can be seen that all CRI values are near 80 or greater, for each of these daylight spectral power distributions.

TABLE 4

| Color Temperature (deg K) | CRI |
| --- | --- |
| 4000 | 97 |
| 4500 | 95 |
| 5000 | 94 |
| 5500 | 95 |
| 6000 | 97 |
| 6500 | 99 |
| 7000 | 96 |
| 7500 | 93 |
| 8000 | 89 |
| 8500 | 86 |
| 9000 | 82 |
| 9300 | 80 |
| 9500 | 79 |

Such a lamp may be constructed using organic light emitting diodes. In a preferred embodiment, an OLED device is constructed by forming a stacked OLED device having two emissive layers. Each of the stacked layers are independently addressable with one stacked layer forming the first light-emitting element and the second forming the second light-emitting element.

Figure 11:
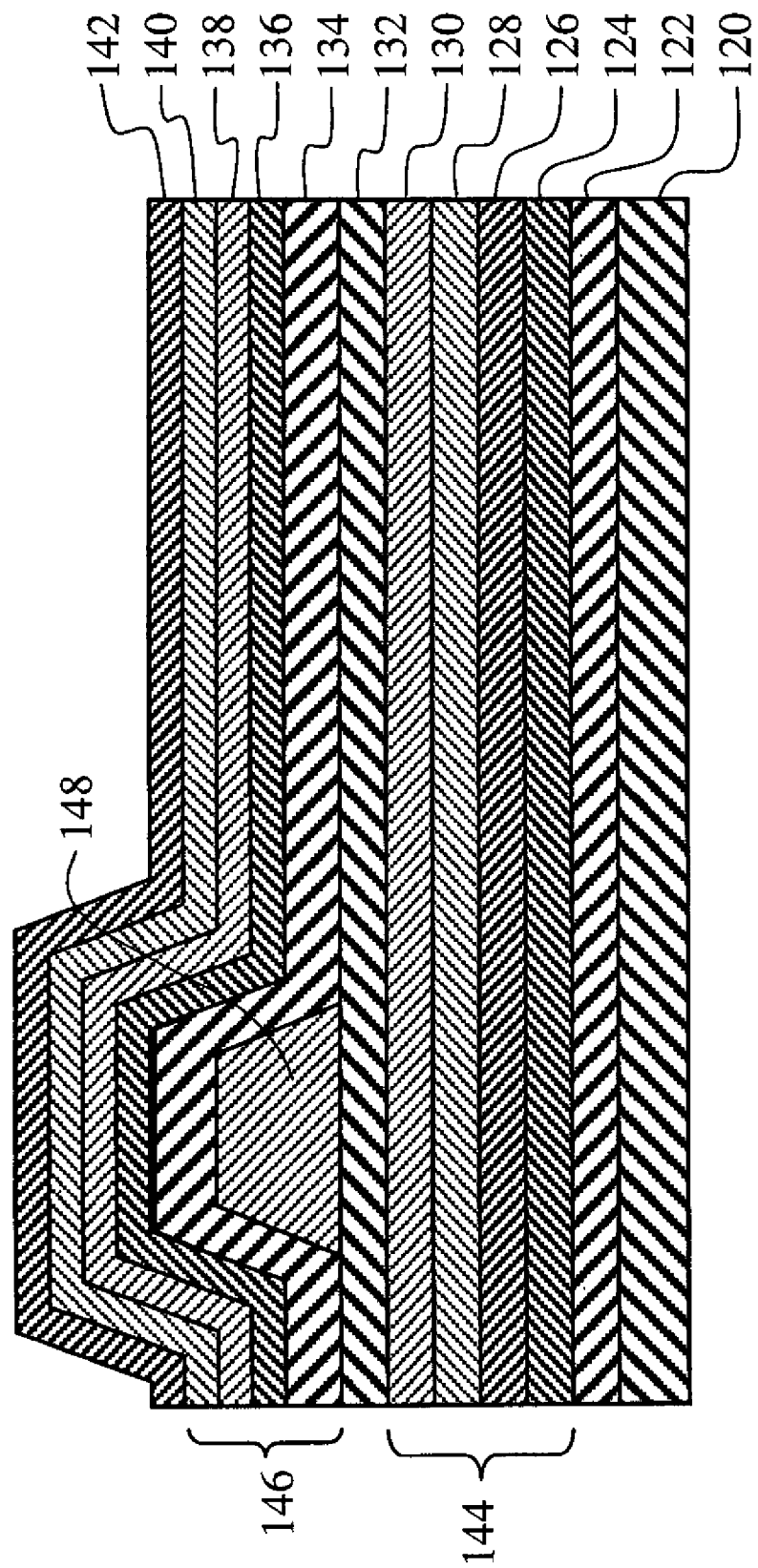
FIG. 11 is a cross-sectional diagram of a pair of organic light-emitting diodes useful in practicing the present invention.

There are numerous configurations of the organic layers wherein the present invention can be successfully practiced. A typical structure of the present invention is shown in FIG. 11 and is comprised of a substrate 120, a first electrode 122, a first optional hole-injecting layer 124, a first hole-transporting layer 126, a first light-emitting layer 128, a first electron-transporting layer 130, a second electrode 132, a second optional hole-injecting layer 134, a second hole-transporting layer 136, a second light-emitting layer 138, a second electron-transporting layer 140 and a third electrode 142. These layers are described in detail below.

Note that the substrate may alternatively be located adjacent to the third electrode, or the substrate may actually constitute the first or third electrodes. To simplify the discussion, the combination of the first optional hole-injecting layer 124, the first hole-transporting layer 126, the first light-emitting layer 128, and the first electron-transporting layer 130 will be referred to as the first EL unit 144. The combination of the second optional hole-injecting layer 134, the second hole-transporting layer 136, the second light-emitting layer 138, and the second electron-transporting layer 140 will be referred to as the second EL unit 146. The total combined thickness of the organic layers within each EL unit is preferably less than 500 nm.

In a preferred embodiment of this device structure, each of the three electrodes will be addressed independently, allowing simultaneous, independent control of the two EL units. However, it should be recognized that simultaneous, independent control of the two layers is not necessary and that other device structures that enable time-sequential, independent control of the two layers may also be useful in practicing this invention.

To provide simultaneous, independent control of the two EL units, it must be possible to simultaneously and independently provide a positive bias across each EL unit. Within the preferred embodiment, this will be accomplished by allowing the second electrode to provide a reference voltage while a positive electrical potential is created across the first EL 124 unit by increasing the voltage to the first electrode 102 with respect to the reference voltage of the second electrode 112. This voltage differential will create a positive electrical potential between the hole-injecting layer 104 and the electron transport layer 110 of the first EL unit 124. Simultaneously, an independent, positive electrical potential may be created across the second EL unit 126 by decreasing the voltage of the third electrode 122 with respect to the second electrode 112 to create a negative voltage differential between the third 122 and second electrode 112. This voltage differential will create a positive electrical potential between the hole-injecting layer 114 and the electron transport layer 120 of the second EL unit 126. By adjusting the ratio of the voltage differential between the first 102 and second 112 electrode to the voltage differential between the third 122 and second 112 electrode, the relative luminance of the light produced by the first 124 and second 126 EL units will be adjusted.

Note that within this embodiment, the first light-emitting element 4 is comprised of the first electrode 122, the first EL unit 144 and the second electrode 132. The second light-emitting element 6 is comprised of the second electrode 132, the second EL unit 146, and the third electrode 142.

The present invention can be employed in several OLED device configurations. These include simple structures comprising three electrodes, passive matrix-devices comprised of arrays of electrodes wherein the first 122 and third 142 electrodes are parallel to one another and oriented perpendicular to the second 132 electrode, and active-matrix devices where each OLED or a group of OLEDs are controlled independently, for example, with a thin-film transistor (TFT).

Each of the layers of this device are further described for clarification.

Substrate

The OLED device of this invention is typically provided over a supporting substrate 120 where either of the first or third electrodes can be located near the substrate. The electrode near the substrate is conveniently referred to as the bottom electrode. Conventionally, the bottom electrode is the first electrode, but this invention is not limited to that configuration. The substrate can either be light-transmissive or opaque, depending on the intended direction of light emission. The light-transmissive property is desirable for viewing the EL emission through the substrate. Transparent glass or plastic is commonly employed in such cases. For applications where the EL emission is not viewed through the bottom electrode, the transmissive characteristic of the bottom support is immaterial, and therefore can be light transmissive, light absorbing or light reflective. Substrates for use in this case include, but are not limited to, glass, plastic, semiconductor materials, silicon, ceramics, and circuit board materials. Of course in these device configurations, the remaining electrodes must be semi-transparent or transparent.

Electrodes

When EL emission is viewed through either the first 122 or the third 142 electrode, the electrode should be transparent or substantially transparent to the emission of interest. Generally, the remaining of the first 122 or third 122 electrodes will be reflective. The second electrode 132 will also be transparent or semi-transparent to the emission of interest.

For the electrodes that are transparent, various materials may be used in this invention, including indium-tin oxide (ITO), indium-zinc oxide (IZO) and tin oxide, but other metal oxides can work including, but not limited to, aluminum- or indium-doped zinc oxide, magnesium-indium oxide, and nickel-tungsten oxide. In addition to these oxides, metal nitrides, such as gallium nitride, and metal selenides, such as zinc selenide, and metal sulfides, such as zinc sulfide, can be used. For applications where EL emission is not viewed through one of the electrodes, the transmissive characteristics of the electrode are immaterial and any conductive material can be used, transparent, opaque or reflective. Example conductors for this application include, but are not limited to, gold, iridium, molybdenum, palladium, and platinum. Generally the first 122 and third 142 electrodes will serve as anodes. Typical anode materials, transmissive or otherwise, have a work function of 4.1 eV or greater.

Desirable materials for the electrodes that serve as a cathode should have good film-forming properties to ensure good contact with the underlying organic layer, promote electron injection at low voltage, and have good stability. Useful cathode materials often contain a low work function metal (<4.0 eV) or metal alloy. One preferred cathode material is comprised of a Mg:Ag alloy wherein the percentage of silver is in the range of 1 to 20%, as described in U.S. Pat. No. 4,885,221. Another suitable class of cathode materials includes bilayers comprising a thin electron-injection layer (EIL) in contact with the organic layer (e.g., ETL), which is capped with a thicker layer of a conductive metal. Here, the EIL preferably includes a low work function metal or metal salt, and if so, the thicker capping layer does not need to have a low work function. One such cathode is comprised of a thin layer of LiF followed by a thicker layer of Al as described in U.S. Pat. No. 5,677,572. Other useful cathode material sets include, but are not limited to, those disclosed in U.S. Pat. Nos. 5,059,861; 5,059,862, and 6,140,763.

Since the second electrode 132 will typically serve as the cathode, one would expect light emission to be viewed through this electrode. Therefore, the electrode must be transparent or nearly transparent. For such applications, metals must be thin or one must use transparent conductive oxides, or a combination of these materials. Optically transparent cathodes have been described in more detail in U.S. Pat. No. 4,885,211, U.S. Pat. No. 5,247,190, JP 3,234,963, U.S. Pat. No. 5,703,436, U.S. Pat. No. 5,608,287, U.S. Pat. No. 5,837,391, U.S. Pat. No. 5,677,572, U.S. Pat. No. 5,776,622, U.S. Pat. No. 5,776,623, U.S. Pat. No. 5,714,838, U.S. Pat. No. 5,969,474, U.S. Pat. No. 5,739,545, U.S. Pat. No. 5,981,306, U.S. Pat. No. 6,137,223, U.S. Pat. No. 6,140,763, U.S. Pat. No. 6,172,459, EP 1 076 368, and U.S. Pat. No. 6,278,236. Electrode materials are typically deposited by evaporation, sputtering, or chemical vapor deposition. When needed, patterning can be achieved through many well known methods including, but not limited to, through-mask deposition, integral shadow masking as described in U.S. Pat. No. 5,276,380 and EP 0 732 868, laser ablation, and selective chemical vapor deposition.

Hole-Injecting Layers (HIL)

It is often useful to provide hole-injecting layers 124 and 134 between the first electrode 122 and the first hole-transporting layer 126 as well as between the second electrode 132 and the second hole-transporting layer 136. The hole-injecting material can serve to improve the film formation property of subsequent organic layers and to facilitate injection of holes into the hole-transporting layer. Suitable materials for use in the hole-injecting layer include, but are not limited to, porphyrinic compounds as described in U.S. Pat. No. 4,720,432, and plasma-deposited fluorocarbon polymers as described in U.S. Pat. No. 6,208,075. Alternative hole-injecting materials reportedly useful in organic EL devices are described in EP 0 891 121 A1 and EP 1 029 909 A1.

Hole-Transporting Layers (HTL)

The hole-transporting layers 126 and 136 contain at least one hole-transporting compound such as an aromatic tertiary amine, where the latter is understood to be a compound containing at least one trivalent nitrogen atom that is bonded only to carbon atoms, at least one of which is a member of an aromatic ring. In one form the aromatic tertiary amine can be an arylamine, such as a monoarylamine, diarylamine, triarylamine, or a polymeric arylamine. Exemplary monomeric triarylamines are illustrated by Klupfel et al. U.S. Pat. No. 3,180,730. Other suitable triarylamines substituted with one or more vinyl radicals and/or comprising at least one active hydrogen containing group are disclosed by Brantley et al U.S. Pat. Nos. 3,567,450 and 3,658,520.

A more preferred class of aromatic tertiary amines are those which include at least two aromatic tertiary amine moieties as described in U.S. Pat. Nos. 4,720,432 and 5,061,569. The hole-transporting layer can be formed of a single or a mixture of aromatic tertiary amine compounds. Illustrative of useful aromatic tertiary amines are the following:

1,1-Bis(4-di-p-tolylaminophenyl)cyclohexane
1,1-Bis(4-di-p-tolylaminophenyl)-4-phenylcyclohexane
4,4'-Bis(diphenylamino)quadriphenyl
Bis(4-dimethylamino-2-methylphenyl)-phenylmethane
N,N,N-Tri(p-tolyl)amine
4-(di-p-tolylamino)-4'-[4(di-p-tolylamino)-styryl]stilbene
N,N,N',N'-Tetra-p-tolyl-4-4'-diaminobiphenyl
N,N,N',N'-Tetraphenyl-4,4'-diaminobiphenyl
N,N,N',N'-tetra-1-naphthyl-4,4'-diaminobiphenyl
N,N,N',N'-tetra-2-naphthyl-4,4'-diaminobiphenyl
N-Phenylcarbazole
4,4'-Bis[N-(1-naphthyl)-N-phenylamino]biphenyl
4,4'-Bis[N-(1-naphthyl)-N-(2-naphthyl)amino]biphenyl
4,4"-Bis[N-(1-naphthyl)-N-phenylamino]p-terphenyl
4,4'-Bis[N-(2-naphthyl)-N-phenylamino]biphenyl
4,4'-Bis[N-(3-acenaphthenyl)-N-phenylamino]biphenyl
1,5-Bis[N-(1-naphthyl)-N-phenylamino]naphthalene
4,4'-Bis[N-(9-anthryl)-N-phenylamino]biphenyl
4,4"-Bis[N-(1-anthryl)-N-phenylamino]-p-terphenyl
4,4'-Bis[N-(2-phenanthryl)-N-phenylamino]biphenyl
4,4'-Bis[N-(8-fluoranthenyl)-N-phenylamino]biphenyl
4,4'-Bis[N-(2-pyrenyl)-N-phenylamino]biphenyl
4,4'-Bis[N-(2-naphthacenyl)-N-phenylamino]biphenyl
4,4'-Bis[N-(2-perylenyl)-N-phenylamino]biphenyl
4,4'-Bis[N-(1-coronenyl)-N-phenylamino]biphenyl
2,6-Bis(di-p-tolylamino)naphthalene
2,6-Bis[di-(1-naphthyl)amino]naphthalene
2,6-Bis[N-(1-naphthyl)-N-(2-naphthyl)amino]naphthalene
N,N,N',N'-Tetra(2-naphthyl)-4,4"-diamino-p-terphenyl
4,4'-Bis{N-phenyl-N-[4-(1-naphthyl)-phenyl]amino}biphenyl
4,4'-Bis[N-phenyl-N-(2-pyrenyl)amino]biphenyl
2,6-Bis[N,N-di(2-naphthyl)amine]fluorene
1,5-Bis[N-(1-naphthyl)-N-phenylamino]naphthalene Another class of useful hole-transporting materials includes polycyclic aromatic compounds as described in EP 1 009 041. In addition, polymeric hole-transporting materials can be used such as poly(N-vinylcarbazole) (PVK), polythiophenes, polypyrrole, polyaniline, and copolymers such as poly(3,4-ethylenedioxythiophene)/poly(4-styrenesulfonate) also called PEDOT/PSS.

Light-Emitting Layers (LEL)

As more fully described in U.S. Pat. Nos. 4,769,292 and 5,935,721, the light-emitting layers (LEL) 128 and 138 of the first and second EL units 144 and 146 include a luminescent or fluorescent material where electroluminescence is produced as a result of electron-hole pair recombination in this region. The light-emitting layer can be comprised of a single material, but more commonly consists of a host material doped with a guest compound or compounds where light emission comes primarily from the dopant and can be of any color. For the purposes of this invention, these dopants are alternately referred to as a species of emitter. The host materials in the light-emitting layer can be an electron-transporting material, as defined below, a hole-transporting material, as defined above, or another material or combination of materials that support hole-electron recombination. The dopant is usually chosen from highly fluorescent dyes, but phosphorescent compounds, e.g., transition metal complexes as described in WO 98/55561, WO 00/18851, WO 00/57676, and WO 00/70655 are also useful. Dopants are typically coated as 0.01 to 10% by weight into the host material. Polymeric materials such as polyfluorenes and polyvinylarylenes (e.g., poly(p-phenylenevinylene), PPV) can also be used as the host material. In this case, small molecule dopants can be molecularly dispersed into the polymeric host, or the dopant could be added by copolymerizing a minor constituent into the host polymer.

An important relationship for choosing a dye as a dopant is a comparison of the bandgap potential which is defined as the energy difference between the highest occupied molecular orbital and the lowest unoccupied molecular orbital of the molecule. For efficient energy transfer from the host to the dopant molecule, a necessary condition is that the band gap of the dopant is smaller than that of the host material.

Host and emitting molecules known to be of use include, but are not limited to, those disclosed in U.S. Pat. Nos. 4,768,292; 5,141,671; 5,150,006; 5,151,629; 5,405,709; 5,484,922; 5,593,788; 5,645,948; 5,683,823; 5,755,999; 5,928,802; 5,935,720; 5,935,721; and 6,020,078.

Metal complexes of 8-hydroxyquinoline(oxine) and similar derivatives constitute one class of useful host compounds capable of supporting electroluminescence. Illustrative of useful chelated oxinoid compounds are the following:

CO-1: Aluminum trisoxine[alias, tris(8-quinolinolato)aluminum(III)]
CO-2: Magnesium bisoxine[alias, bis(8-quinolinolato)magnesium(II)]
CO-3: Bis[benzo{f}-8-quinolinolato]zinc (II)
CO-4: Bis(2-methyl-8-quinolinolato)aluminum(III)-μ-oxo-bis(2-methyl-8-quinolinolato)aluminum(III)
CO-5: Indium trisoxine[alias, tris(8-quinolinolato)indium]
CO-6: Aluminum tris(5-methyloxine)[alias, tris(5-methyl-8-quinolinolato)aluminum(III)]
CO-7: Lithium oxine[alias, (8-quinolinolato)lithium(I)]
CO-8: Gallium oxine[alias, tris(8-quinolinolato)gallium(III)]
CO-9: Zirconium oxine[alias, tetra(8-quinolinolato)zirconium(IV)]

Other classes of useful host materials include, but are not limited to: derivatives of anthracene, such as 9,10-di-(2-naphthyl)anthracene and derivatives thereof, distyrylarylene derivatives as described in U.S. Pat. No. 5,121,029, and benzazole derivatives, for example, 2,2',2"-(1,3,5-phenylene)tris[1-phenyl-1H-benzimidazole].

Useful fluorescent dopants include, but are not limited to, derivatives of anthracene, tetracene, xanthene, perylene, rubrene, coumarin, rhodamine, quinacridone, dicyanomethylenepyran compounds, thiopyran compounds, polymethine compounds, pyrilium and thiapyrilium compounds, fluorene derivatives, periflanthene derivatives and carbostyryl compounds.

Many dopants are known that produce light with a dominant peak at one wavelength within the visible spectrum. Often the devices of the present invention require an OLED structure that is capable of creating light that has dominant peaks at two or more separate wavelengths in order to create the broadband emission that is necessary to practice the current invention. Such a light-emitting layer may be formed using two or more light emitting layers that are coated on top of another as discussed in co-pending U.S. docket 88042, which is herein included by reference. Each of these two or more light-emitting layers includes a first host material and a first light-emitting material. Placing more than one layer of light emitting material, each layer capable of producing light with a different peak wavelength within the structure, allows the construction of an EL structure to be formed that produces broadband emission. Further by adjusting the concentrations of the dopants used to create each peak wavelength, the relative height of each peak may be adjusted to form a spectral power distribution having the desired shape.

Electron-Transporting Layers (ETL)

Preferred thin film-forming materials for use in forming the electron-transporting layers 130 and 140 of the EL units of this invention are metal chelated oxinoid compounds, including chelates of oxine itself (also commonly referred to as 8-quinolinol or 8-hydroxyquinoline). Such compounds help to inject and transport electrons, exhibit high levels of performance, and are readily fabricated in the form of thin films. Exemplary oxinoid compounds were listed previously.

Other electron-transporting materials include various butadiene derivatives as disclosed in U.S. Pat. No. 4,356,429 and various heterocyclic optical brighteners as described in U.S. Pat. No. 4,539,507. Benzazoles and triazines are also useful electron-transporting materials.

In some instances, layers 130 and 128, as well as layers 140 and 138 can optionally be collapsed into a single layer that serve the function of supporting both light emission and electron transport. These layers can be collapsed in both small-molecule OLED systems and in polymeric OLED systems. For example, in polymeric systems, it is common to employ a hole-transporting layer such as PEDOT-PSS with a polymeric light-emitting layer such as PPV. In this system, PPV serves the function of supporting both light emission and electron transport.

Deposition of Organic Layers

The organic materials mentioned above are suitably deposited through a vapor-phase method such as sublimation, but can be deposited from a fluid, for example, from a solvent with an optional binder to improve film formation. If the material is a polymer, solvent deposition is useful but other methods can be used, such as sputtering or thermal transfer from a donor sheet. The material to be deposited by sublimation can be vaporized from a sublimator "boat" often comprised of a tantalum material, e.g., as described in U.S. Pat.

No. 6,237,529, or can be first coated onto a donor sheet and then sublimed in closer proximity to the substrate. Layers with a mixture of materials can utilize separate sublimator boats or the materials can be pre-mixed and coated from a single boat or donor sheet. Patterned deposition can be achieved using shadow masks, integral shadow masks (U.S. Pat. No. 5,294,870), spatially-defined thermal dye transfer from a donor sheet (U.S. Pat. Nos. 5,851,709 and 6,066,357) and inkjet method (U.S. Pat. No. 6,066,357).

Tandem Layers

Although the embodiment depicted in FIG. 1 illustrates a first 144 and second 146 EL unit in which each is comprised of a single stack of an optional hole-injecting layer 124, a first hole-transporting layer 126, a first light-emitting layer 128, and a first electron-transporting layer 130, one or both of these EL units may be comprised of more than one such stack that is operated in tandem as disclosed in US Patent Application US 2003/0170491 filed by Liao and Tang and entitled "Providing an organic electroluminescent device having stacked electroluminescent units" and US Patent Application 2003/0189401 filed by Kido and Hayashi and entitled "Organic electroluminescent device". In such a device, a plurality of light-emitting layers are provided between a pair of electrodes, thereby increasing the amount of light emitted at the cost of an increased driving voltage. Within these structures a connecting layer is often coated between successive layers of HIL, HTL, LEL, and ETL. Such a connecting layer may also be formed from a hole-transporting layer and an electron-transporting layer. As such, a device having tandem layers will have multiple light-emitting layers connected together by intermediate layers, wherein each of the tandem layers share a common pair of electrodes.

Encapsulation

Most OLED devices are sensitive to moisture or oxygen, or both, so they are commonly sealed in an inert atmosphere such as nitrogen or argon, along with a desiccant such as alumina, bauxite, calcium sulfate, clays, silica gel, zeolites, alkaline metal oxides, alkaline earth metal oxides, sulfates, or metal halides and perchlorates. Methods for encapsulation and desiccation include, but are not limited to, those described in U.S. Pat. No. 6,226,890. In addition, barrier layers such as SiOx, Teflon, and alternating inorganic/polymeric layers are known in the art for encapsulation.

Optical Optimization

OLED devices of this invention can employ various well-known optical effects in order to enhance its properties if desired. This includes optimizing layer thicknesses to yield maximum light transmission, providing dielectric mirror structures, replacing reflective electrodes with light-absorbing electrodes, providing anti glare or anti-reflection coatings over the device, providing a polarizing medium over the device, or providing colored, neutral density, or color conversion filters over the device. Filters, polarizers, and anti-glare or anti-reflection coatings may be specifically provided over the cover or as part of the cover. In applications where a diffuse luminance is required, the top of the lamp may be coated with a scattering layer which is placed on the emitting side of the OLEDs, and if desired, also in the interstitial areas between the OLEDs. The scattering media may comprise small particles with a relatively high index of refraction that do not appreciably absorb the visible light from the OLED device. Such light scattering particles are titania, alumina, or zinc oxide particles, including $TiO_2$. However, other particles, including $BaTiO_3$, $SiO_2$, $CaCO_3$, $BaSO_4$ may also be used. This layer may comprise a layer of packed light scattering particles or a carrier medium containing the light scattering particles. The carrier medium may be any appropriate medium; including glass or polymer materials, such as epoxy, silicone or urea resin.

Exemplary Embodiments

Having described each of the layers in detail, exemplary embodiments may now be further described.

In one such exemplary embodiment, a device is constructed from one or more of the structures depicted in FIG. 11 wherein, the first electrode 122 is reflective. The first EL unit 144 is formed over the first electrode and is doped to emit light that is substantially yellow in color and that has been tuned to have the spectral characteristics described previously. Typically this first EL unit will include several species of emitters, which are either mixed or stacked between a single ETL and HTL. Various tandem layers may also contain different species of emitters to form the desired light emission, such as shown in FIG. 10. The second electrode 132 is formed over the second EL unit 144 and is semi-transparent. A bus bar 148 is then formed over the second anode. The function of this bus bar is to carry high currents that the typically thin, semi-transparent second electrode is not capable of carrying. Typically this bus bar will be formed from the same material as the second electrode, but may be formed from other conductive materials. The second EL unit 146 is then formed over the second electrode 132 and is doped to emit light that is substantially blue in color and that has been tuned to have the spectral characteristics described previously. Finally, the third electrode layer 142 is a transparent or semi-transparent conductor. When the device is constructed from more than one structure, these structures may be connected in series and/or parallel as known in the prior art.

It should be noted that any of the embodiments discussed may be implemented by placing each of the two electroluminescent light-emitting elements between any two electrodes. The light-emitting elements may share an electrode as described. However, in another embodiment, each light-emitting element may be formed between a pair of electrodes. In one such embodiment, a first electrode may be formed followed by an EL unit and a second electrode. An insulating layer may then be applied and then followed by a third electrode, the second EL unit and the fourth electrode. In another embodiment an electrode may be formed on a substrate followed by an EL unit and a second electrode. A third electrode may be formed on a second substrate and followed by a second EL unit and a fourth electrode. These two substrates may then be laminated or packaged together to form the final lamp. Each of these embodiments include the coating of a single EL unit between any pair of electrodes. However, in another embodiment, a first and a second stack of emitting materials may be patterned between first and second electrodes. Such an embodiment has the potential to simplify the device, as only a pair of electrodes are necessary, however, it will be necessary to separately control the electrodes for the first light-emitting element independently of the electrodes for the second light-emitting element. This may be accomplished, for example, by controlling the voltage to some of the anode lines independently of the cathode lines.

While each of the embodiments discussed within this disclosure has included first and second EL units that are each formed from similar stacks of organic materials, these EL units may be formed in a non-repeating fashion as well. In another embodiment, the order of the layers forming either the first and/or second EL unit may be reversed. In such an embodiment, the first EL unit 144 may be formed by forming a stack including the first optional hole-injecting layer 124 on the first electrode 122, followed by the first hole-transporting layer 126, the first light-emitting layer 128, and the first electron-transporting layer 130. However, the second EL unit 146 may be formed from an inverted stack in which the second electron-transporting layer 140 is deposited on the second electrode 132, the second light-emitting layer 138 is deposited on the second electron-transporting layer 140, the second hole-transporting layer 136 is deposited on the second light-emitting layer 138 and the second optional hole-injecting layer 134 is deposited on the second electron-transporting layer 136. By forming the device in this way, an electrical potential having the same polarity may be used to drive both the first and second EL units within the device. Such a device structure in which one of the first 144 or second 146 EL units are inverted eliminates the need for both positive and negative power lines within the device design as either a negative or positive voltage may then be used to drive both the first and second EL units with a positive bias. This not only simplifies the panel layout by reducing the number of power lines required within an active-matrix device design, but simplifies the power supply as it is not necessary to provide both positive and negative voltages to the device.

Selection of the proportion of light to be emitted by each of the two light-emitting elements 4, 6 when a line drawn between the CIE uniform chromaticity scale coordinates of the two light sources is substantially parallel to a portion of the Planckian (blackbody) locus allows one to create light output with chromaticity coordinates that lie on a line near the Planckian (blackbody) locus. By selecting the appropriate proportion of the light output from these two light-emitting elements one can create light output that approximates several standard daylighting conditions, such as those designated D50, D65, and D93. To achieve this selection, one must control the relative light output of the two light sources. This control may be affected in many ways. This control will typically either provide a fixed ratio of light output or allow the ratio to be dynamically adjusted. When a fixed ratio is to be provided a single lamp may be manufactured with a correlated color temperature, if the light emitted is controlled by attaching different control mechanisms to the lamp, hence, allowing the sale of multiple colors of lamps from a single manufacturing process. Therefore, the cost of manufacturing lamps having different colors of light output is reduced. Dynamic adjustment of color temperature requires a mechanism for dynamic control of the color of the lamp light, but may provide additional customer value through dynamic control.

Figure 12:
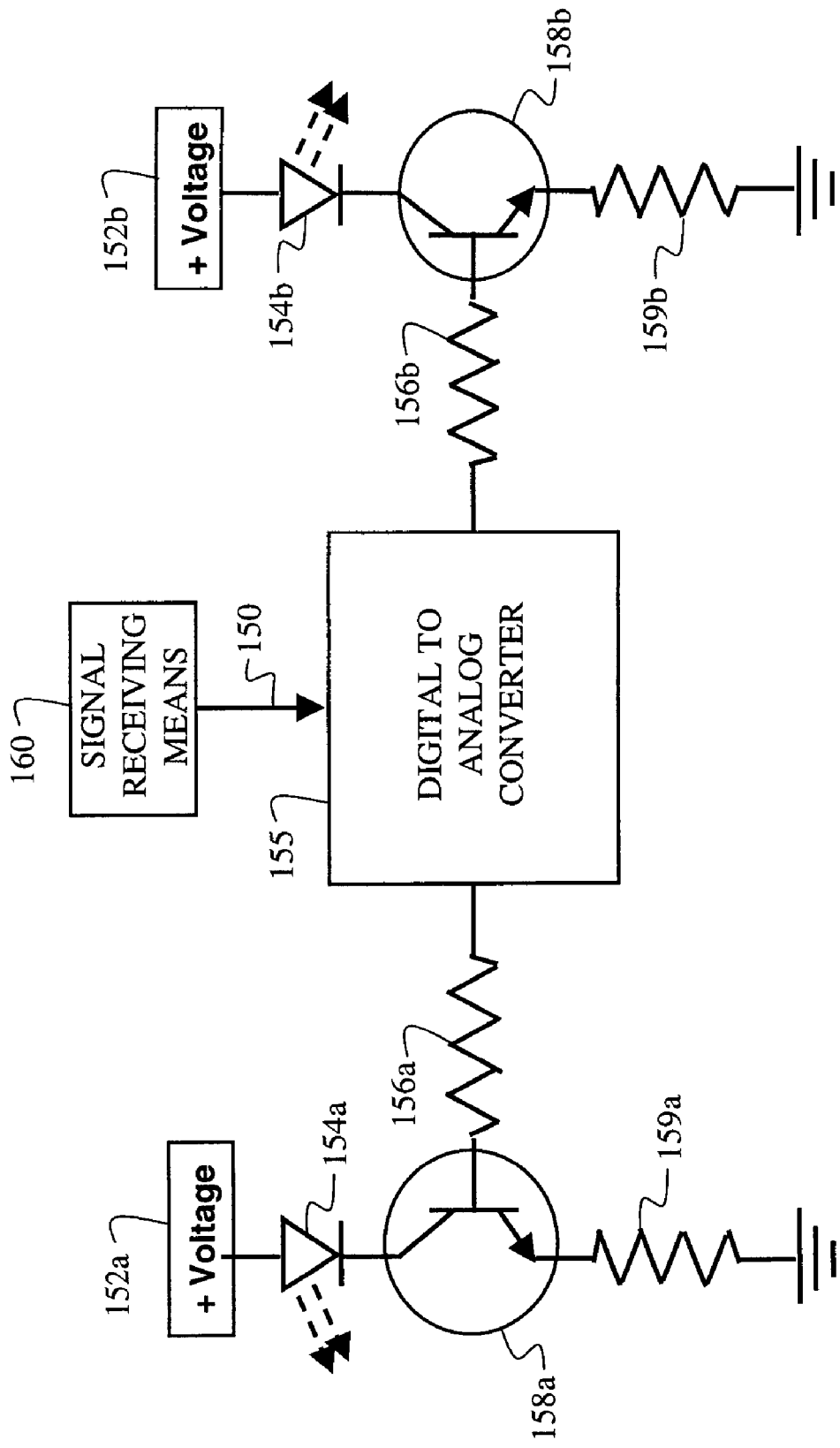
FIG. 12 is a controller according to one embodiment of the present invention.

FIG. 12 shows a schematic of a controller 8 useful in practicing the present invention. In general, the light output of a light-emitting diode is proportional to its drive current, therefore, the dynamic controller may be any controller that controls the relative current to the two light-emitting elements, either by directly modulating the current or by modulating the voltage to indirectly modulate the average current. One such drive circuit design for converting a source voltage to a current is shown in FIG. 12. In FIG. 12, power supplies 152*a* and 152*b* are connected to light-emitting elements 154*a* and 154*b*, here shown as light-emitting diodes (LEDs). In response to a control signal 150, a digital to analog converter 155 applies a voltage signal across resistors 156*a* and 156*b* to the gates of transistors 158*a* and 158*b*, respectively. The resistors 156*a* and 156*b* are small, and are included to prevent instabilities in the voltages applied to the transistor gates. The signals applied to the transistors control the amount of current flowing through them, and in turn, the amount of current that can flow through the LEDs 154*a* and 154*b*. The resistors 159*a* and 159*b* serve to further regulate the LED currents. Control of the LED currents provides direct control of the LED light outputs. The control signals sent by the digital to analog converter 155 to the transistors 158*a* and 158*b* will depend on the desired output ratio, and will be prescribed by the input digital signal 150, which will receive the control signal from a signal receiving means 160 for receiving input signals from an external source. Although this embodiment provides a digital controller, similar analog controllers can also be applied. The signal receiving means may be an electrical connection or may be a more complex system, including a wireless receiver, which receives a signal from a remote source.

It is important to note that the controller must only vary the relative intensity (i.e., the ratio of the integrated spectral power from a first light-emitting element to the integrated spectral power of a second light-emitting element) of the two light-emitting elements to control the spectral power distribution of the light produced by the lamp for a correlated color temperature range between 3000K-10,000K. This is important for many reasons. For instance, if the two light-emitting elements age at a different rates (i.e., one loses a larger percentage of its integrated spectral power than the other at a given input power), the same color temperatures and spectral power distributions can be obtained simply by adjusting the relative drive power (i.e., voltage or current) to each light-emitting element, thereby ameliorating one of the problems present in the prior art. Further, since there are only two light-emitting elements, continuously changing the ratio of the power to each light-emitting element will vary the luminous output of the two light-emitting elements without creating any discontinuous increase in perceived luminance.

Figure 13:
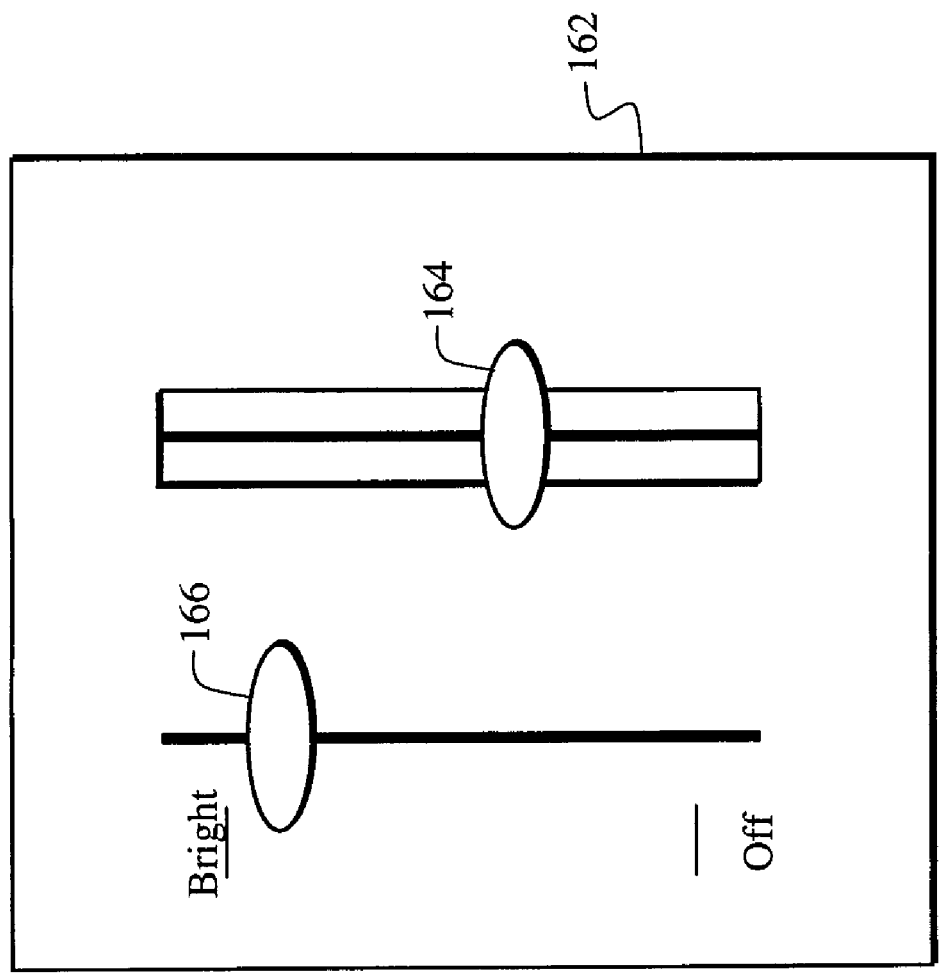
FIG. 13 is a depiction of user controls useful in providing a control signal to the controller of the present invention.

A significant advantage of the lamp of the present invention is that it may be easily controlled, such that the luminous output of the lamp may be adjusted in a way that it is substantially independent of the spectral power distribution of the lamp. FIG. 13 shows one potential configuration of user controls 162, wherein a first control 164 may be used to adjust the overall luminous output of the lamp; allowing the user to turn the lamp on or off, as well as to dim or brighten the lamp. This control will provide a signal to the controller, which will control the overall electrical power that is provided to the lamp while maintaining a constant ratio of the power to the first and second light-emitting elements. Therefore, maintaining a constant ratio of integrated spectral power from a first light-emitting element to the integrated spectral power of a second light-emitting element and the output spectral power distribution of the lamp. This control will typically be labeled with words or icons depicting the on and off state. A second control 166 may be used to adjust the spectral power distribution of the lamp. This control will provide a signal to the controller, which will adjust the ratio of the electrical potential across the first light-emitting element 4 and the second light-emitting element 6.

Figure 14:
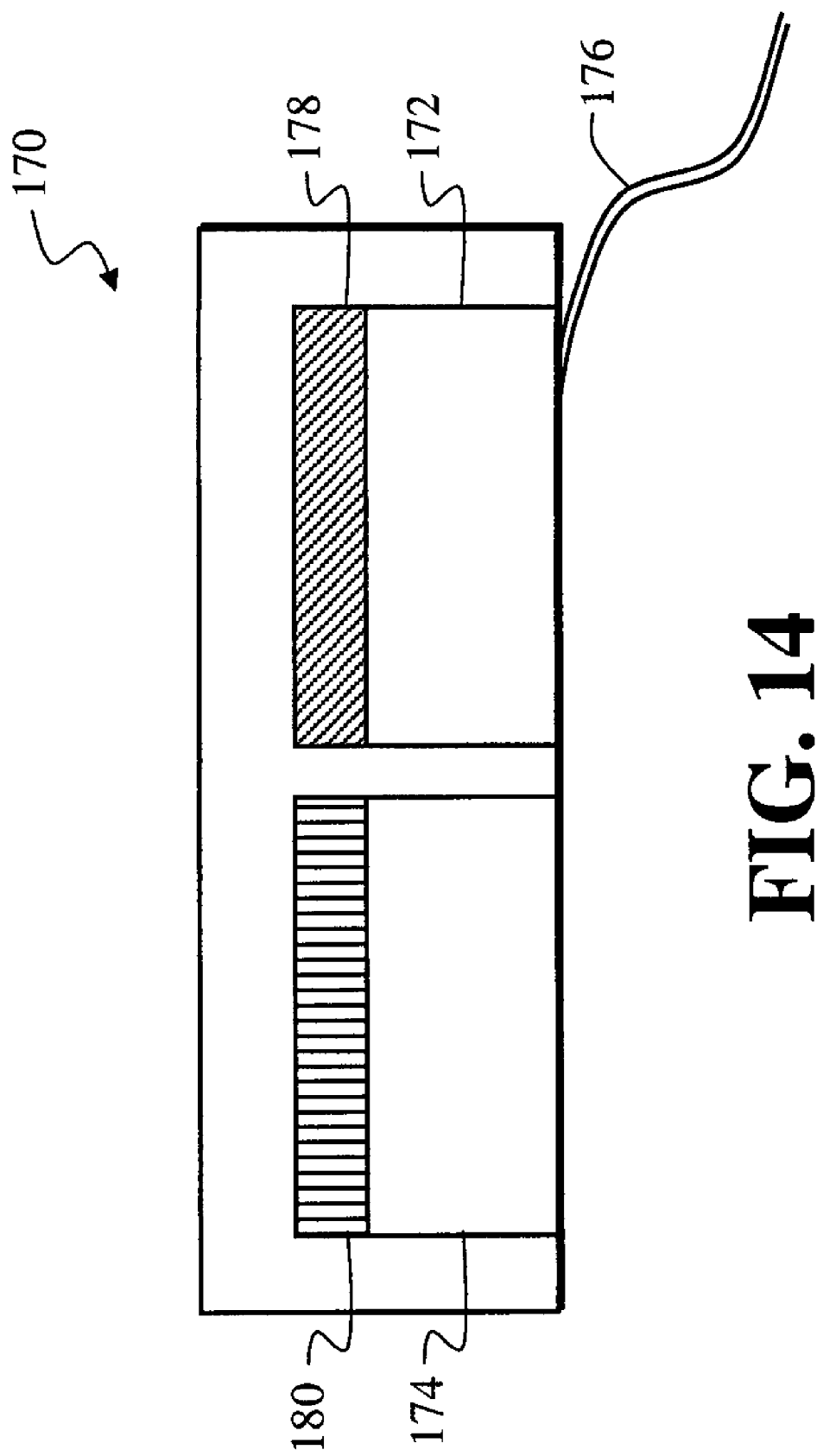
FIG. 14 is a depiction of a sensor useful in providing a control signal to the controller of the present invention.

Although this lamp may be manually controlled to produce light having different output spectral power distributions, there are systems in which it is desirable to automatically control the output spectral power distribution and potentially the overall luminous output to obtain a desired effect. In one such system, a user may wish that the spectral power distribution provided by the lamp match the spectral power distribution of natural light from an outdoor environment. For such an application, a sensor 170, such as the one shown in FIG. 14, may be designed to have two or more sensing elements 172, 174 and provide a means 176 for providing an output signal, such as a wire, to the controller 8. At least two of the sensing elements 172, 174, will have different spectral sensitivities. Ideally, the spectral sensitivity of the two sensing elements are such that the spectral sensitivity of the first sensing element 172 approximates the spectral power distribution of the first light-emitting element 4 in the lamp and the spectral sensitivity of the second sensing element 174 approximates the spectral power distribution of the second light-emitting element 6. The spectral sensitivities of these two sensing elements 172, 174 may be adjusted by applying different color filters 178, 180 to the two sensing elements. In such a system, the ratio of the outputs of the two sensors may then be used to directly control the ratio of the power provided to the two light-emitting elements in the lamp. As such, the external source 160 of the controller 8 is an optical sensor 170 that includes at least two light sensitive elements 172, 174, wherein each light sensitive element has a different spectral response and wherein the controller adjusts the ratio of the integrated spectral power from the first light-emitting element to the spectral power from the second light-emitting element as a function of the ratio of the output from the first and second light sensitive element. It is important to note that within this embodiment no microprocessor is necessary. Instead, analog outputs from the sensor may be used to directly control the lamp through traditional analog circuitry. Sensors may also be applied that have more sensing elements than the number of light-emitting elements or that have a spectral response that differs from the spectral power distribution of the light-emitting elements. However, in such system a microprocessor will likely be required to determine the spectral composition of the light in the environment and then to determine the ratio of the light output by the two light-emitting elements in the lamp, which provide the spectral power distribution that is as close as possible to the spectral power distribution of light in the environment. It should be noted that such a sensor may be attached to the lamp, to the controller or to any other surface in the environment.

Yet another application may be to artificially simulate more natural lighting environments. In one application, it is known that shift workers often suffer from sleeping disorders. One possible method of addressing such a disorder may be to provide lighting within the work environment that mimics the outdoor environment. In this application, the spectral power distribution of the lamp may be adjusted based on time of day, so as to mimic the changes in color temperature that occur as the sun rises, moves across the sky and sets. In such a system, a typical timer is provided as the external source 160 to the controller 8. This timer may provide an absolute or relative signal. That is, it may indicate the time of day and the controller may adjust the ratio of the integrated spectral power of each of the two light-emitting elements based upon this information. Alternatively, the timer may indicate a relative signal, such as the time elapsed since the beginning of the work shift and the controller may adjust the ratio of the integrated spectral power of each of the two light-emitting elements based upon this information.

Figure 15:
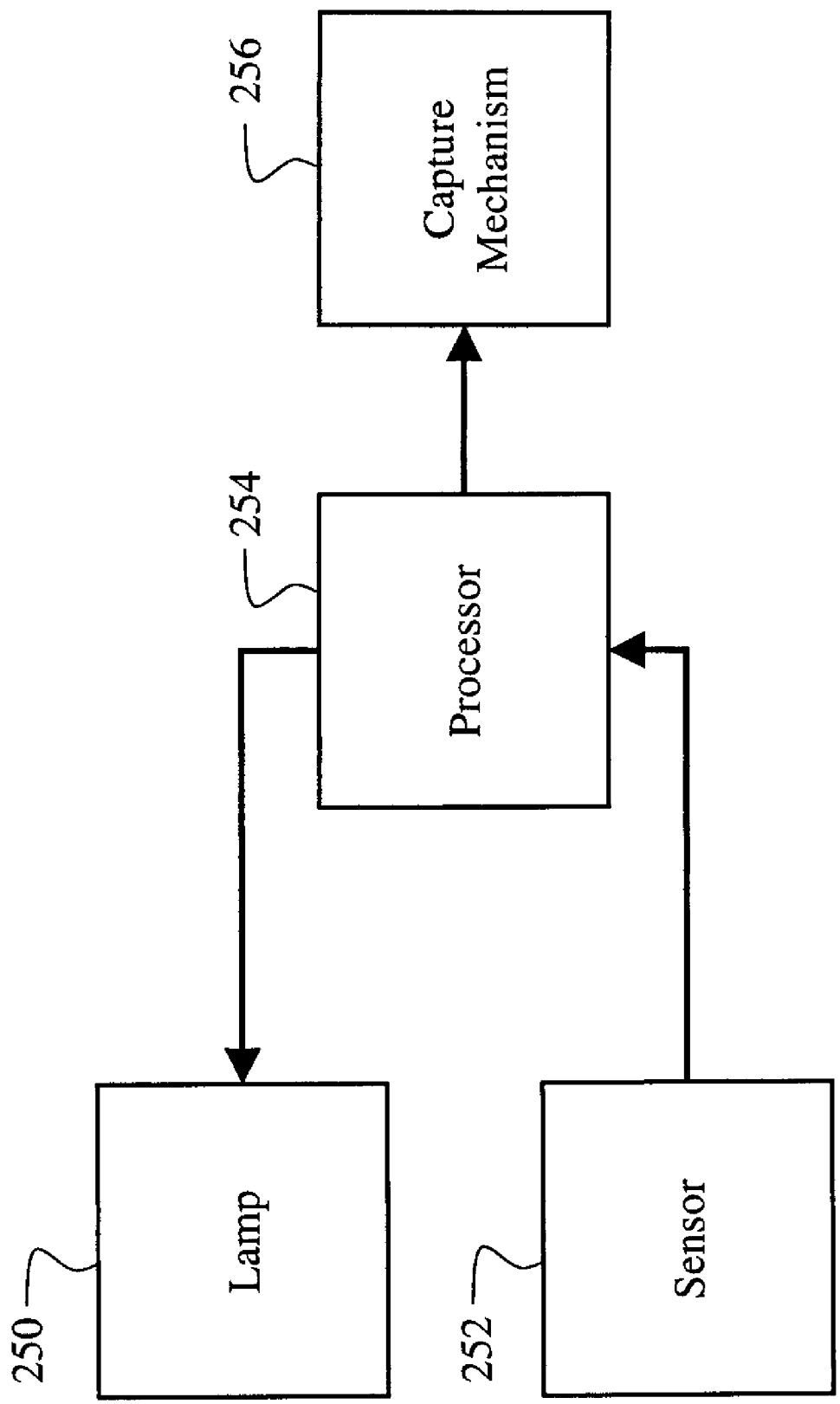
FIG. 15 is a depiction of an image capture device according to one embodiment of the present invention.

Another application is to provide an auxiliary light source for photographic systems, including flash still photography and directed continuous lighting for motion image capture. A schematic diagram of such a photographic system is shown in FIG. 15. As shown in this figure, the photographic system is equipped with a sensor 252. The sensor is ideally composed of at least two light sensitive elements as discussed with respect to FIG. 14, wherein each light sensitive element has a spectral response that mimics the spectral power distribution of each of the two light-emitting elements from which the lamp 250 is constructed. The lamp is a lamp of the present invention that provides illumination that is, if strobed, synchronized with the capture mechanism 256. An optional processor 254 may be used to interpret the signal provided from the sensor and/or to determine the drive signals required to attain the desired response from the lamp 250. This same processor 254 may be used to synchronize the image capture with the illumination provided by the lamp 250.

Within an exemplary embodiment, the combined response from the two light sensitive elements will be inversely related to the desired integrated spectral power of the lamp and, therefore, inversely related to the current used to drive the lamp. The inverse relationship between the overall illumination level determined by the sensor 252 and the integrated spectral power that is produced by the lamp 250 is important since it is important that the lamp 250 produce a stronger compensating illumination source when the environment is dimly illuminated. In this system, the relative response of the two light sensitive elements is directly proportional to the relative luminance to be produced by the two light-emitting elements from which the lamp 250 is constructed. The fact that the relative response of the two light sensitive elements is directly proportional to the relative luminous intensity to be produced by the two light-emitting elements from which the lamp 250 is constructed, allows the spectral response of the lamp to be matched, as well as possible, to the spectral power distribution of the other illumination sources within the environment.

Within photographic systems, matching the spectral power distributions of flash or spot lighting to the spectral power distribution of other lights within the environment is important for two reasons. First, photographic systems attempt to determine the predominant illumination source and correct for this source to create photographs that appear neutrally balanced when viewed in a variety of environments. When a variety of colors of illumination are present during image capture, these algorithms are unable to correctly detect or correct for these multiple sources of illumination without providing locally adaptive processing. Such algorithms are extremely difficult to design and are often not robust to the variety of lighting conditions that can be present. Further, if such an algorithm could be constructed, it would require significant processing power, hence increasing the potential cost of the photographic systems in which they are employed. Second, if locally adaptive processing is not applied to an image that has been captured in an environment with illumination sources that have multiple, distinct spectral power distributions and the color balance is not corrected, at least some portions of the resulting photographs will appear to have a colored cast, which is not desirable and detracts from the value of the final photograph.

Those skilled in the art will recognize that while the sensor 252 will ideally have two light-sensitive elements, it may alternatively have one light sensitive element or more than two light sensitive elements. If the sensor 252 has only one light sensitive element, this sensor may be used only to adjust the overall luminous intensity of the lamp 250. However, any time the sensor 252 has at least two light sensitive elements, each light sensitive element having a different spectral response, the response from this sensor may be used to estimate the spectral power distribution of the environmental illumination. Having an estimate of the environmental illumination, the ratio of integrated spectral power from a first light-emitting element to the integrated spectral power of a second light-emitting element to control spectral power of the two light-emitting elements within the lamp 250 may be adjusted to provide as close a spectral match to the spectral power distribution of the environmental illumination as possible.

The examples provided in this disclosure have generally discussed two light-emitting elements for emitting light having a color temperature of 4000K and 9500K. However, one skilled in the art will recognize that this is not required and the color temperature of either emitter may be significantly smaller or larger than either of these values. For instance, the lower color temperature might be extended down to near 3000K to provide illumination having more the color of tungsten or even sodium vapor lamps. Further, the higher color temperature may be extended further into the 12000 or even 15000K range for some applications. However, the range of color temperatures will generally be selected such that a straight line between their chromaticity coordinates lies along a substantially straight portion of the Planckian locus. The examples provided in this disclosure have also discussed providing multiple species of emitters within each light-emitting element. Different examples employed species of emitters having different bandwidths, however, each example employed emitters having the same bandwidth. This is again not necessary within the present invention as it can be desirable to employ species of emitters having wider bandwidths near the center of the visible spectrum than near the ends to achieve the goals of this invention.

The invention has been described in detail with particular reference to certain preferred embodiments thereof, but it will be understood that variations and modifications can be effected within the spirit and scope of the invention.

PARTS LIST 2 lamp
4 first light-emitting element
6 second light-emitting element
8 controller
10a signal control line for first light-emitting element
10b signal control line for second light-emitting element
12 coordinates for first light-emitting element
14 coordinates for second light-emitting element
16 Planckian Locus
18 coordinates of fit to D50
20 coordinates of fit to D65
22 coordinates of fit to D93
30 spectral power distribution for first light-emitting element
32 spectral power distribution for second light-emitting element
34 first wavelength band
36 second wavelength band
38 third wavelength band
42 lamp spectral power distribution at D50
44 CIE standard spectral power distribution for D50
46 lamp spectral power distribution at D65
48 CIE standard spectral power distribution for D65
50 lamp spectral power distribution at D93
52 CIE standard spectral power distribution for D93
56 electro-luminescent device
58 quantum dot inorganic light-emitting layer
60 substrate
62 anode
64 bus metal
66 cathode
70 inorganic quantum dot light-emitting layer
72 first type of quantum dot
74 second type of quantum dot
76 third type of quantum dot
78 conducting elements
80 spectral power distribution of first light-emitting element
82 spectral power distribution of second light-emitting element
90 coordinates for first light-emitting element
92 coordinate for second light-emitting element
94 coordinates of fit to D50
96 coordinates of fit to D65
102 spectral power distribution for first light-emitting element
104 spectral power distribution for second light-emitting element
112 spectral power distribution for first light-emitting element
114 spectral power distribution for second light-emitting element
120 substrate
122 first electrode
124 first hole-injecting layer
126 first hole-transporting layer
128 first light-emitting layer
130 first electron transporting layer
132 second electrode
134 second hole-injecting layer
136 second hole-transporting layer
138 second light-emitting layer
140 second electron transporting layer
142 third electrode
144 first EL unit
146 second EL unit
150 control signal
152a power supply
152b power supply
154a first light-emitting element
154b second light-emitting element
155 digital to analog converter
156a resistor
156b resistor
158a transistor
158b transistor
159a resistor
159b resistor
160 signal receiving means
162 user controls
164 brightness control
166 color temperature control
170 sensor
172 first sensing element
174 second sensing element
176 output signal means
178 color filter
180 color filter
250 lamp
252 sensor
254 processor
256 capture mechanism

The invention claimed is:

1. A white-light electro-luminescent lamp having an adjustable spectral power distribution, comprising:
   a. a first light-emitting element which emits light within each of three wavelength bands, including a first wavelength band between 440 and 520 nm, a second wavelength band between 520 and 600 nm, and a third wavelength band between 600 and 680 nm wherein an integrated spectral power of the first wavelength band is higher than the integrated spectral power of the second wavelength band and the integrated spectral power of the second wavelength band is higher than the integrated spectral power of the third wavelength band;

b. a second light-emitting element which emits light within each of three wavelength bands, including a first wavelength band between 440 and 520 nm, a second wavelength band between 520 and 600 nm, and a third wavelength band between 600 and 680 nm wherein the integrated spectral power of the third wavelength band is higher than the integrated spectral power of the second wavelength band and the integrated spectral power of the second wavelength band is higher than the integrated spectral power of the first wavelength band; and c. a controller that modulates the integrated spectral power of the light produced by the first and the second light-emitting elements such that the spectral power distribution of the light formed by combining the light produced by the modulated first and second light-emitting elements is substantially equal to a CIE standard daylight spectral power distribution for correlated color temperatures between 4000K-9500K.

2. The white-light electro-luminescent lamp of claim 1, wherein the spectral power of the first light emitting element decreases monotonically between 450 nm and 660 nm and the spectral power of the second light-emitting element increases monotonically between 450 nm and 660 nm.

3. The white-light electro-luminescent lamp of claim 1, wherein each of the first and second light-emitting elements is formed from a plurality of species of emitters.

4. The white-light electro-luminescent lamp of claim 3, wherein the spectral power distribution for each of the first and second light emitting elements is continuous between 450 nm and 660 nm and includes multiple local maxima, each local maximum having a peak amplitude, wherein the peak amplitude of the local maxima for the first light emitting element decreases monotonically as a function of increasing wavelength and the peak amplitude of the local maxima for the second light emitting element increases monotonically as a function of increasing wavelength.

5. The white-light electro-luminescent lamp of claim 1, wherein the lamp produces light having a color rendering index equal to or greater than 80 for correlated color temperatures corresponding to CIE standard illuminants D50, D65, and D93 by adjusting the ratio of the light emitted from the first and second light-emitting elements.

6. The white-light electro-luminescent lamp of claim 1, wherein the first light emitting element emits light having first chromaticity coordinates and the second light-emitting element emits light having second chromaticity coordinates and wherein these chromaticity coordinates lie on a line that passes within 0.05 chromaticity units within the CIE 1976 UCS chromaticity diagram of the chromaticity coordinates of the D50, D65, and D93 illuminants.

7. The white-light electro-luminescent lamp of claim 1, wherein the lamp is comprised of:
a. a substrate;
b. a first light-emitting element comprised of a first electro-luminescent unit positioned between, and in electrical contact with, two electrodes; and
c. a second light-emitting element comprised of a second electro-luminescent unit positioned between, and also in electrical contact with two electrodes, while located above or below the first electro-luminescent unit.

8. The white-light electro-luminescent lamp of claim 7 wherein at least one of the first and second electro-luminescent units is comprised of tandem light emitting layers.

9. The white-light electro-luminescent lamp of claim 1, wherein the lamp is comprised of:
a. a substrate;
b. a first array of electrodes;
c. a patterned array of first electro-luminescent units (EL) for forming the first light-emitting elements and second electro-luminescent (EL) units for forming the second light-emitting elements; and
d. a second array of electrodes wherein the electrodes are patterned such that the first and second light-emitting elements are independently addressable.

10. The white-light electro-luminescent lamp of claim 9 wherein at least one of the first and second EL units is comprised of tandem light emitting layers.

11. The white-light electro-luminescent lamp claimed in claim 1, wherein the controller dynamically controls the ratio of the integrated spectral power of the light produced by the first light-emitting element to the integrated spectral power of the light produced by the second light-emitting element.

12. The white-light electro-luminescent lamp claimed in claim 1, wherein the controller adjusts the spectral power distribution of the white-light electro-luminescent lamp and further includes:
a. a control means for increasing or decreasing a ratio of integrated spectral power from the light produced by a first light-emitting element to the integrated spectral power of the light produced by a second light-emitting element to control the spectral power distribution of the light produced by the lamp for a correlated color temperature range between 4000K-9500K; and
b. a signal receiving means for receiving input signals from an external source.

13. The controller claimed in claim 12, wherein the luminous output of the white-light electro-luminescent lamp is increased or decreased by controlling the integrated spectral power of the light produced by both the first and second light-emitting elements.

14. The controller claimed in claim 12, wherein the external source is a sensor that includes at least two light sensitive elements, each light sensitive element has a different spectral response and wherein the controller adjusts the ratio of the integrated spectral power of the light produced from the first light-emitting element to the spectral power of the light produced from the second light-emitting element as a function of the ratio of the output from the first and second light sensitive elements.

15. The controller of claim 14, wherein signals from the at least two light sensitive elements are summed, and the integrated spectral power of the light produced by both the first and the second light-emitting elements are adjusted as a function of the sum.

16. The controller of claim 12, wherein the source is a timer, and wherein the ratio of the integrated spectral power of the light produced by the first light-emitting element to the integrated spectral power of the light produced by the second light-emitting element is varied as a function of elapsed or absolute time.

17. The white-light electro-luminescent lamp having an adjustable spectral power distribution claimed in claim 1, wherein the lamp provides a source of illumination for an image capture device.

18. The white-light electro-luminescent lamp having an adjustable spectral power distribution of claim 17 wherein the controller receives a control signal from an optical sensor and the controller adjusts the ratio of integrated spectral power of the light produced from a first light-emitting element to the integrated spectral power of the light produced from a second light-emitting element to control the spectral power distribution of the light emitted by the lamp in response to the control signal.

19. An image capture device containing a lamp producing light with an adjustable spectral power distribution, wherein the spectral power of the light produced by the lamp is comprised of:
- a. a first light-emitting element which emits light within each of three wavelength bands, including a first wavelength band between 440 and 520 nm, a second wavelength band between 520 and 600 nm, and a third wavelength band between 600 and 680 nm wherein an integrated spectral power of the first wavelength band is higher than the integrated spectral power of the second wavelength band and the integrated spectral power of the second wavelength band is higher than the integrated spectral power of the third wavelength band;
- b. a second light-emitting element which emits light within each of three wavelength bands, including a first wavelength band between 440 and 520 nm, a second wavelength band between 520 and 600 nm, and a third wavelength band between 600 and 680 nm wherein the integrated spectral power of the third wavelength band is higher than the integrated spectral power of the second wavelength band and the integrated spectral power of the second wavelength band is higher than the integrated spectral power of the first wavelength and a controller that modulates the integrated spectral power of the light produced by the first and the second light-emitting elements such that the spectral power distribution of the light formed by combining the light produced by the modulated first and second light-emitting elements is substantially equal to a CIE daylight spectral power distribution for correlated color temperatures between 4000K-9500K.

20. The image capture device of claim 19, wherein the image capture device further includes a sensor, wherein the sensor includes at least two light sensitive elements, each light sensitive element having a different spectral response and wherein the controller adjusts the ratio of the integrated spectral power of the light produced from the first light-emitting element to the spectral power of the light produced from the second light-emitting element as a function of the ratio of the output from the first and second light sensitive elements.

* * * * *